(12) United States Patent
Christiansson et al.

(10) Patent No.: US 9,411,444 B2
(45) Date of Patent: Aug. 9, 2016

(54) TOUCH DETERMINATION BY TOMOGRAPHIC RECONSTRUCTION

(75) Inventors: Tomas Christiansson, Torna-Haellestad (SE); Mats Petter Wallander, Lund (SE); Peter Juhlin, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 472 days.

(21) Appl. No.: 13/824,026

(22) PCT Filed: Oct. 7, 2011

(86) PCT No.: PCT/SE2011/051201
§ 371 (c)(1),
(2), (4) Date: Jun. 4, 2013

(87) PCT Pub. No.: WO2012/050510
PCT Pub. Date: Apr. 19, 2012

(65) Prior Publication Data
US 2013/0249833 A1    Sep. 26, 2013

Related U.S. Application Data

(60) Provisional application No. 61/391,764, filed on Oct. 11, 2010.

(30) Foreign Application Priority Data

Oct. 11, 2010 (SE) ...................................... 1051061

(51) Int. Cl.
*G06F 3/041* (2006.01)
*G06F 3/042* (2006.01)

(52) U.S. Cl.
CPC .............. *G06F 3/041* (2013.01); *G06F 3/0428* (2013.01); *G06F 2203/04109* (2013.01)

(58) Field of Classification Search
CPC ..................... G06F 3/0423; G06F 2203/04109; G06F 3/0428; G06F 3/041
See application file for complete search history.

(56) References Cited

U.S. PATENT DOCUMENTS 4,891,829 A * 1/1990 Deckman ............. G01N 23/046
378/19
5,345,490 A 9/1994 Finnigan et al.
(Continued)

FOREIGN PATENT DOCUMENTS

WO  WO-2007092316 A2  8/2007
WO  WO 2007/112742    10/2007
(Continued)

OTHER PUBLICATIONS

Kak et al, "Principles of Computerized Tomographic Imaging", (1999), The Institute of Electrical Engineers, Inc.
(Continued)

*Primary Examiner* — Quan-Zhen Wang
*Assistant Examiner* — Xuemei Zheng
(74) *Attorney, Agent, or Firm* — Harness, Dickey & Pierce, P.L.C.

(57) ABSTRACT

A touch-sensitive apparatus comprises a panel for conducting signals from incoupling points to outcoupling points. Detection lines are defined between pairs of incoupling and outcoupling points. A signal generator is coupled to the incoupling points to generate the signals. A data processor processes the output signal to generate a set of data samples, which are non-uniformly arranged in a two-dimensional sample space. Each data sample is indicative of detected energy on a detection line and is defined by a signal value and first and second dimension values defining the location of the detection line on the surface portion. Adjustment factors are obtained for the data samples, each adjustment factor being representative of the local density of data samples in the sample space. The data samples are processed by tomographic reconstruction, while applying the adjustment factors, to generate a reconstructed distribution of an energy-related parameter within the surface portion.

23 Claims, 19 Drawing Sheets

(56) References Cited

U.S. PATENT DOCUMENTS

| | | | |
|---|---|---|---|
| 6,972,753 | B1 | 12/2005 | Kimura et al. |
| 7,065,234 | B2 | 6/2006 | Du et al. |
| 7,432,893 | B2 | 10/2008 | Ma et al. |
| 2004/0252091 | A1 | 12/2004 | Ma et al. |
| 2005/0143923 | A1* | 6/2005 | Keers ............... G01V 1/28 702/14 |
| 2006/0114237 | A1 | 6/2006 | Crockett et al. |
| 2007/0014486 | A1* | 1/2007 | Schiwietz ......... G01R 33/4824 382/276 |
| 2007/0075648 | A1 | 4/2007 | Blythe et al. |
| 2008/0130979 | A1* | 6/2008 | Ren et al. ................. 382/132 |
| 2009/0153519 | A1 | 6/2009 | Suarez et al. |
| 2010/0039405 | A1 | 2/2010 | Chen et al. |
| 2011/0069807 | A1* | 3/2011 | Dennerlein ........ G06T 11/006 378/4 |

FOREIGN PATENT DOCUMENTS

| | | |
|---|---|---|
| WO | WO-2008150325 A1 | 12/2008 |
| WO | WO 2009/048365 | 4/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/064983 | 6/2010 |
| WO | WO 2011/049513 | 4/2011 |
| WO | WO 2011/139213 | 11/2011 |

OTHER PUBLICATIONS

Natterer, "The Mathematics of Computerized Tomography", Classics in Applied Mathematics; 32, 2001, pp. 1-222.

Karsten Fourmont, Non-Equispaced Fast Fourier Transforms with Applications to Tomography, The Journal of Fourier Analysis and Applications, vol. 9, Issue 5, 2003, pp. 431-450.

Frank Natterer, et al., "Mathematical Methods in Image Reconstruction, Chapter 5: Reconstruction Algorithms", Jan. 1, 2001, Siam Books, Philadelphia, USA, XP002715809, ISBN: 978-0-89871-622-1 pp. 81-137.

Zienkiewicz, et al., "Finite Element Method—Its Basis and Fundamentals (6th Edition), Chapter 8: Automatic Mesh Generation", Dec. 31, 2005, Elsevier, XP002718826, ISBN: 978-0-7506-6320-5, pp. 264-328.

Extended European Search Report dated Jan. 28, 2014, issued in European Patent Application No. 11832837.6.

* cited by examiner

TOUCH DETERMINATION BY TOMOGRAPHIC RECONSTRUCTION

This application is the national phase under 35 U.S.C. §371 of PCT International Application No. PCT/SE2011/051201 which has an International filing date of Oct. 7, 2011, which claims priority to Swedish patent application number 1051061-8 filed Oct. 11, 2010, and to U.S. Provisional patent application No. 61/391,764 filed Oct. 11, 2010.

CROSS-REFERENCE TO RELATED APPLICATIONS

The present application claims the benefit of Swedish patent application No. 1051061-8, filed on Oct. 11, 2010, and U.S. provisional application No. 61/391,764, filed on Oct. 11, 2010, both of which are incorporated herein by reference.

TECHNICAL FIELD

The present invention relates to touch-sensitive panels and data processing techniques in relation to such panels.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse tomographic reconstruction of the light field across the panel surface is then created by geometrically back-tracing and triangulating all attenuations observed in the received light. This is stated to result in data regarding the position and size of each contact area.

US2009/0153519 discloses a panel capable of conducting signals. A "tomograph" is positioned adjacent the panel with signal flow ports arrayed around the border of the panel at discrete locations. Signals (b) measured at the signal flow ports are tomographically processed to generate a two-dimensional representation (x) of the conductivity on the panel, whereby touching objects on the panel surface can be detected. The presented technique for tomographic reconstruction is based on a linear model of the tomographic system, Ax=b. The system matrix A is calculated at factory, and its pseudo inverse $A^{-1}$ is calculated using Truncated SVD algorithms and operated on the measured signals to yield the two-dimensional (2D) representation of the conductivity: $x=A^{-1}b$. The suggested method is both demanding in the term of processing and lacks suppression of high frequency components, possibly leading to much noise in the 2D representation.

US2009/0153519 also makes a general reference to Computer Tomography (CT). CT methods are well-known imaging methods which have been developed for medical purposes. CT methods employ digital geometry processing to reconstruct an image of the inside of an object based on a large series of projection measurements through the object. Various CT methods have been developed to enable efficient processing and/or precise image reconstruction, e.g. Filtered Back Projection, ART, SART, etc. Often, the projection measurements are carried out in accordance with a standard geometry which is given by the CT method. Clearly, it would be desirable to capitalize on existing CT methods for reconstructing the 2D distribution of an energy-related parameter (light, conductivity, etc) across a touch surface based on a set of projection measurements.

SUMMARY

It is an object of the invention to enable touch determination on a panel based on projection measurements by use of existing CT methods.

Another objective is to provide a technique that enables determination of touch-related data at sufficient precision to discriminate between a plurality of objects in simultaneous contact with a touch surface.

This and other objects, which may appear from the description below, are at least partly achieved by means of a method of enabling touch determination, a computer program product, a device for enabling touch determination, and a touch-sensitive apparatus according to the independent claims, embodiments thereof being defined by the dependent claims.

A first aspect of the invention is a method of enabling touch determination based on an output signal from a touch-sensitive apparatus. The touch-sensitive apparatus comprises a panel configured to conduct signals from a plurality of peripheral incoupling points to a plurality of peripheral outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal. The method comprises: processing the output signal to generate a set of data samples, wherein each data sample is indicative of detected energy on one of the detection lines and is defined by a signal value and first and second dimension values in a two-dimensional sample space, wherein the first and second dimension values define the location of the detection line on the surface portion, and wherein the data samples are non-uniformly arranged in the sample space; obtaining adjustment factors for the set of data samples, wherein each adjustment factor is representative of the local density of data samples in the sample space for a respective data sample; and processing the set of the data samples by tomographic reconstruction, while applying the adjustment factors, to generate data indicative of a reconstructed distribution of an energy-related parameter within at least part of the surface portion.

In one embodiment, the adjustment factor for a given data sample is calculated to represent the number of data samples within a region around the given data sample in the sample space.

In another embodiment, the adjustment factor for a given data sample is calculated to represent an average of a set of smallest distances between the given data sample and neighboring data samples in the sample space.

In yet another embodiment, the adjustment factor for a given data sample is calculated to represent an extent of a Voronoi cell or a set of Delaunay triangles in the sample space for the given data sample.

In yet another embodiment, the reconstructed distribution comprises spatial data points, each spatial data point having a unique location on the surface portion and corresponding to a predetermined curve in the sample space, and the adjustment factor for a given data sample is calculated, for each spatial data point in a set of spatial data points, to represent the interaction between the predetermined curve of the spatial data point and a two-dimensional basis function located at the given data sample, wherein the basis function is given an extent in the sample space that is dependent on the local density. The interaction may be calculated by evaluating a line integral of the basis function, along the predetermined curve.

In one embodiment, the step of obtaining comprises: obtaining, for each spatial data point, a set of adjustment factors associated with a relevant set of data samples. The step of processing the set of data samples may comprise: reconstructing each spatial data point by: scaling the signal value of each data sample in the relevant set of data samples by its corresponding adjustment factor and summing the thus-scaled signal values.

In one embodiment, the predetermined curve is designed to include the shape of a predetermined one-dimensional filter function which extends in the first dimension of the sample space and which is centered on and reproduced at plural locations along the curve. In this embodiment, the interaction may be calculated by evaluating a surface integral of the combination of the predetermined curve and the basis function.

In one embodiment, the step of processing the output signal comprises: obtaining a measurement value for each detection line and applying a filter function to generate a filtered signal value for each measurement value, wherein the filtered signal values form said signal values of the data samples. The filter function may be a predetermined one-dimensional filter function which is applied in the first dimension of the sample space.

Alternatively or additionally, the step of applying the filter function may comprise: obtaining estimated signal values around each measurement value in the first dimension, and operating the filter function on the measurement value and the estimated signal values. The filtered signal value may be generated as a weighted summation of the measurement values and the estimated signal values based on the filter function. The estimated signal values may be obtained as measurement values of other detection lines, said other detection lines being selected as a best match to the extent of the filter function in the first dimension, or the estimated signal values may be generated at predetermined locations around the measurement value in the sample space.

In one embodiment, the estimated signal values are generated by interpolation in the sample space based on the measurement values. Each estimated signal value may be generated by interpolation of measurement values of neighboring data samples in the sample space. Alternatively or additionally, the step of processing the output signal further may comprise: obtaining a predetermined two-dimensional interpolation function with nodes corresponding to the data samples, and calculating the estimated signal values according to the interpolation function and based on the measurement values of the data samples.

In one embodiment, the reconstructed distribution comprises spatial data points, each spatial data point having a unique location on the surface portion and corresponding to a predetermined curve in the sample space, and wherein the step of processing the set of data samples comprises: generating filtered signal values for the data samples by scaling the signal value of each data sample by a weight given by a predetermined filter function based on the distance of the data sample from the curve in the first dimension, and evaluating each spatial data point by: scaling the filtered signal value by the adjustment factor of the corresponding data sample and summing the thus-scaled filtered signal values.

In one embodiment, the step of processing the set of data samples comprises: calculating Fourier transformation data for the data samples with respect to the first dimension only, and generating said data indicative of the reconstructed distribution by operating a two-dimensional inverse Fourier transform on the Fourier transformation data, wherein the adjustment factors are applied in the step of calculating Fourier transformation data. The step of calculating the Fourier transformation data may comprise: transforming the data samples to a Fourier domain to produce uniformly arranged Fourier-transformed data samples with respect to the first and second dimensions, and transforming the Fourier-transformed data samples back to the sample space with respect to the second dimension only.

In one embodiment, the first dimension value is a distance of the detection line in the plane of the panel from a predetermined origin, and the second dimension value is a rotation angle of the detection line in the plane of the panel.

In an alternative embodiment, the first dimension value is a rotation angle of the detection line in the plane of the panel, and the second dimension value is an angular location of the incoupling or outcoupling point of the detection line.

A second aspect of the invention is a computer program product comprising computer code which, when executed on a data-processing system, is adapted to carry out the method of the first aspect.

A third aspect of the invention is a device for enabling touch determination based on an output signal from a touch-sensitive apparatus. The touch-sensitive apparatus comprises a panel configured to conduct signals from a plurality of peripheral incoupling points to a plurality of peripheral outcoupling points, thereby defining detection lines that extend across a surface portion of the panel between pairs of incoupling and outcoupling points, signal generating means coupled to the incoupling points to generate the signals, and signal detecting means coupled to the outcoupling points to generate the output signal. The device comprises: means for processing the output signal to generate a set of data samples, wherein each data sample is indicative of detected energy on one of the detection lines and is defined by a signal value and first and second dimension values in a two-dimensional sample space, wherein the first and second dimension values define the location of the detection line on the surface portion, and wherein the data samples are non-uniformly arranged in the sample space; means for obtaining adjustment factors for the set of data samples, wherein each adjustment factor is representative of the local density of data samples in the sample space for a respective data sample; and means for processing the set of the data samples by tomographic reconstruction, while applying the adjustment factors, to generate data indicative of a reconstructed distribution of an energy-related parameter within at least part of the surface portion.

A fourth aspect of the invention is a touch-sensitive apparatus, comprising: a panel configured to conduct signals from a plurality of peripheral incoupling points to a plurality of peripheral outcoupling points, thereby defining detection lines that extend across a surface portion of the panel between pairs of incoupling and outcoupling points; means for generating the signals at the incoupling points; means for generating an output signal based on detected signals at the outcoupling points; and the device for enabling touch determination of the third aspect.

A fifth aspect of the invention is a touch-sensitive apparatus, comprising: a panel configured to conduct signals from a plurality of peripheral incoupling points to a plurality of peripheral outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal; and a signal processor connected to receive the output signal and configured to: process the output signal to generate a set of data samples, wherein each data sample is indicative of detected energy on one of the detection lines and is defined by a signal value and first and second dimension values in a two-dimensional sample space, wherein the first and second dimension values define the location of the detection line on the surface portion, and wherein the data samples are non-uniformly arranged in the sample space; obtain adjustment factors for the set of data samples, wherein each adjustment factor is representative of the local density of data samples in the sample space for a respective data sample; and process the set of the data samples by tomographic reconstruction, while applying the adjustment factors, to generate data indicative of a reconstructed distribution of an energy-related parameter within at least part of the surface portion.

Any one of the embodiments of the first aspect can be combined with the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
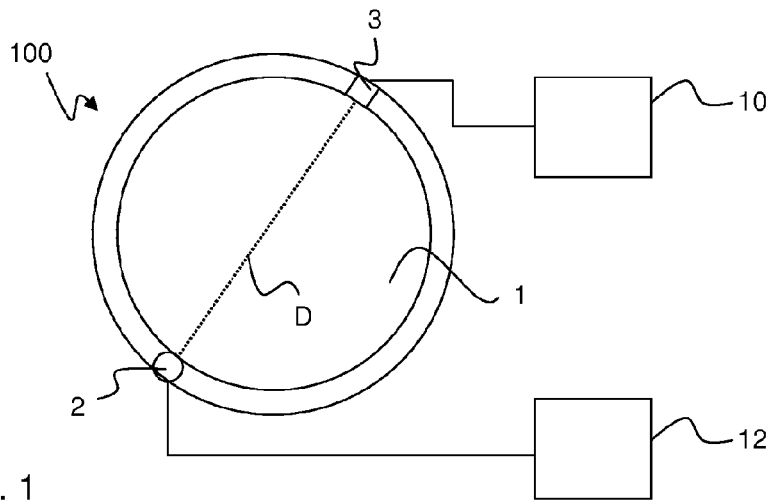
FIG. 1 is a plan view of a touch-sensitive apparatus.

The present invention relates to techniques for enabling extraction of touch data for at least one object, and typically multiple objects, in contact with a touch surface of a touch-sensitive apparatus. The description starts out by presenting the underlying concept of such a touch-sensitive apparatus, especially an apparatus operating by frustrated total internal reflection (FTIR) of light. The description continues to generally explain and exemplify the theory of tomographic reconstruction and its use of standard geometries. Then follows an example of an overall method for touch data extraction involving tomographic reconstruction. Finally, different inventive aspects of applying techniques for tomographic reconstruction for touch determination are further explained and exemplified.

Throughout the description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3.

The arrangement of sensors is electrically connected to a signal processor 10, which samples and processes an output signal from the arrangement. The output signal is indicative of the received energy at each sensor 3. As will be explained below, the signal processor 10 may be configured to process the output signal by a tomographic technique to recreate an image of the distribution of an energy-related parameter (for simplicity, referred to as "energy distribution" in the following) across the touch surface 1. The energy distribution may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2. The signal processor 10 and the controller 12 may be configured as separate units, or they may be incorporated in a single unit. One or both of the signal processor 10 and the controller 12 may be at least partially implemented by software executed by a processing unit.

The touch-sensitive apparatus 100 may be designed to be used with a display device or monitor, e.g. as described in the Background section. Generally, such a display device has a rectangular extent, and thus the touch-sensitive apparatus 100 (the touch surface 1) is also likely to be designed with a rectangular shape. Further, the emitters 2 and sensors 3 all have a fixed position around the perimeter of the touch surface 1. Thus, in contrast to a conventional tomographic apparatus used e.g. in the medical field, there will be no possibility of rotating the complete measurement system. As will be described in further detail below, this puts certain limitations on the use of standard tomographic techniques for recreating/reconstructing the energy distribution within the touch surface 1.

Figure 2:
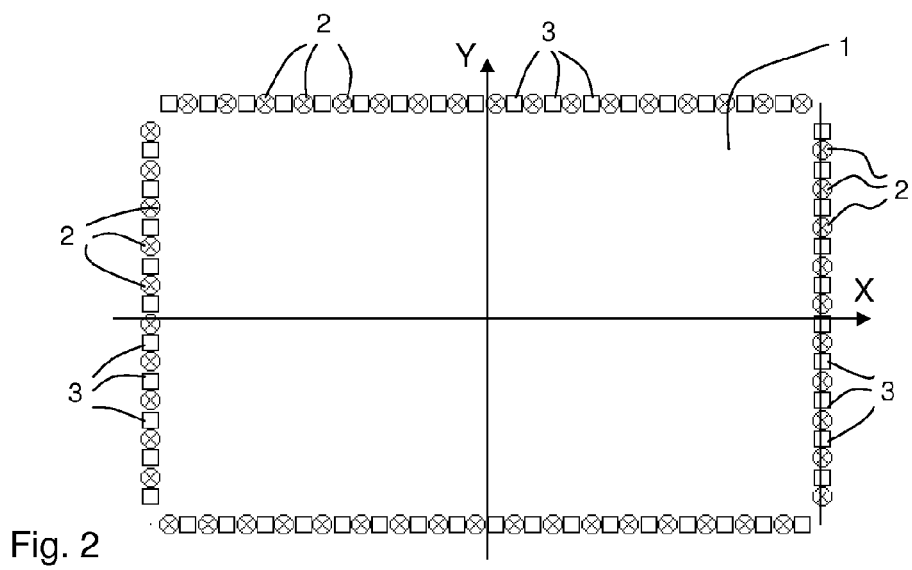
FIG. 2 is a top plan view of a touch-sensitive apparatus with an interleaved arrangement of emitters and sensors.

In the following, embodiments of the invention will be described in relation to an exemplifying arrangement of emitters 2 and sensors 3. This arrangement, shown in FIG. 2, is denoted "interleaved arrangement" and has emitters 2 (indicated by crossed circles) and sensors 3 (indicated by squares) placed one after the other along the periphery of the touch surface 1. Thus, every emitter 2 is placed between two sensors 3. The distance between neighboring emitters 2 is the same along the periphery. The same applies for the distance between neighboring sensors 3.

It is to be understood that this arrangement is given merely for the purpose of illustration and the concepts of the invention are applicable irrespective of aspect ratio, shape of the touch surface, and arrangement of emitters and sensors.

In the embodiments shown herein, at least a subset of the emitters 2 may be arranged to emit energy in the shape of a beam or wave that diverges in the plane of the touch surface 1, and at least a subset of the sensors 3 may be arranged to receive energy over a wide range of angles (field of view). Alternatively or additionally, the individual emitter 2 may be configured to emit a set of separate beams that propagate to a number of sensors 3. In either embodiment, each emitter 2 transmits energy to a plurality of sensors 3, and each sensor 3 receives energy from a plurality of emitters 2.

The touch-sensitive apparatus 100 may be configured to permit transmission of energy in one of many different forms. The emitted signals may thus be any radiation or wave energy that can travel in and across the touch surface 1 including, without limi-tation, light waves in the visible or infrared or ultraviolet spectral regions, electrical energy, electromagnetic or magnetic energy, or sonic and ultrasonic energy or vibration energy.

Figure 3A:
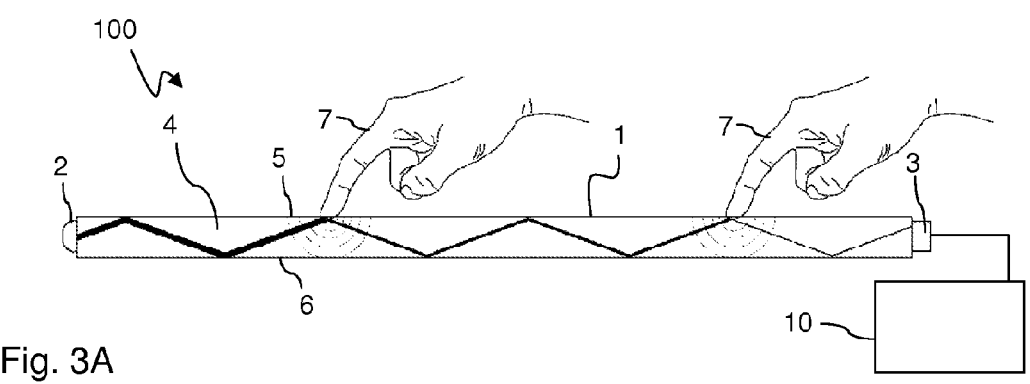
FIGS. 3A-3B are side and top plan views of touch-sensitive systems operating by frustrated total internal reflection (FTIR).

In the following, an example embodiment based on propagation of light will be described. FIG. 3A is a side view of a touch-sensitive apparatus 100 which includes a light transmissive panel 4, one or more light emitters 2 (one shown) and one or more light sensors 3 (one shown). The panel 4 defines two opposite and generally parallel surfaces 5, 6 and may be planar or curved. A radiation propagation channel is provided between two boundary surfaces 5, 6 of the panel 4, wherein at least one of the boundary surfaces allows the propagating light to interact with a touching object 7. Typically, the light from the emitter(s) 2 propagates by total internal reflection (TIR) in the radiation propagation channel, and the sensors 3 are arranged at the periphery of the panel 4 to generate a respective measurement signal which is indicative of the energy of received light.

As shown in FIG. 3A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate unaffected. Thus, when the object 7 touches a boundary surface of the panel (e.g. the top surface 5), the total internal reflection is frustrated and the energy of the transmitted light is decreased. This type of touch-sensitive apparatus is denoted "FTIR system" (FTIR—Frustrated Total Internal Reflection) in the following.

Figure 3B:
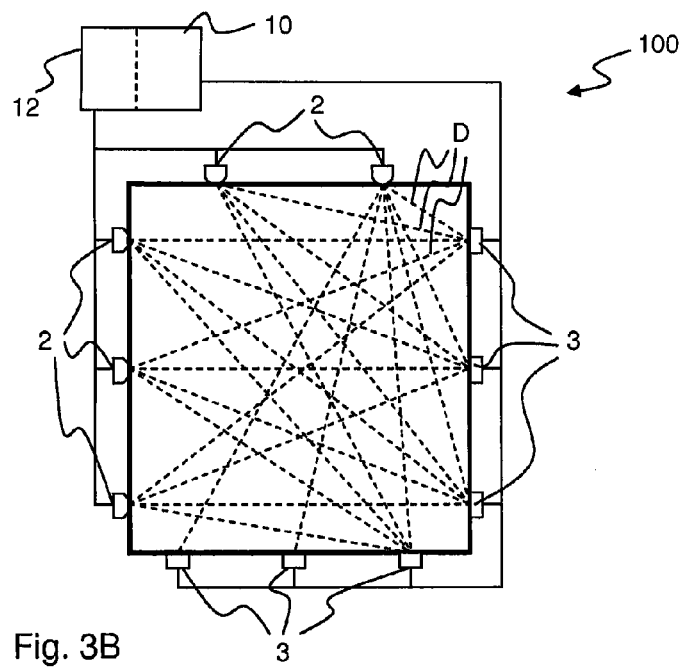

The touch-sensitive apparatus 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 3B, where each emitter 2 generates a beam of light that expands in the plane of the panel 4 while propagating away from the emitter 2. Each beam propagates from one or more entry or incoupling points within an incoupling site on the panel 4. Arrays of light sensors 3 are located around the perimeter of the panel 4 to receive the light from the emitters 2 at a number of spaced-apart outcoupling points within an outcoupling site on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 3B, however, the detection lines D are defined by individual emitter-sensor pairs.

The light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy on a certain detection line. Depending on implementation, the signal processor 10 may need to process the output signal for identification of the individual sub-signals. Irrespective of implementation, the signal processor 10 is able to obtain an ensemble of measurement values that contains information about the distribution of an energy-related parameter across the touch surface 1.

The light emitters 2 can be any type of device capable of emitting light in a desired wavelength range, for example a diode laser, a VCSEL (vertical-cavity surface-emitting laser), or alternatively an LED (light-emitting diode), an incandescent lamp, a halogen lamp, etc.

The light sensors 3 can be any type of device capable of detecting the energy of light emitted by the set of emitters, such as a photodetector, an optical detector, a photo-resistor, a photovoltaic cell, a photodiode, a reverse-biased LED acting as photodiode, a charge-coupled device (CCD) etc.

The emitters 2 may be activated in sequence, such that the received energy is measured by the sensors 3 for each light sheet separately. Alternatively, all or a subset of the emitters 2 may be activated concurrently, e.g. by modulating the emitters 2 such that the light energy measured by the sensors 3 can be separated into the sub-signals by a corresponding demodulation.

Reverting to the emitter-sensor-arrangements in FIG. 2, the spacing between neighboring emitters 2 and sensors 3 is generally from about 1 mm to about 20 mm. For practical as well as resolution purposes, the spacing is generally in the 2-10 mm range.

In a variant of the interleaved arrangement, the emitters 2 and sensors 3 may partially or wholly overlap, as seen in a plan view. This can be accomplished by placing the emitters 2 and sensors 3 on opposite sides of the panel 4, or in some equivalent optical arrangement.

It is to be understood that FIG. 3 merely illustrates one example of an FTIR system. For example, the detection lines may instead be generated by sweeping or scanning one or more beams of light inside the panel. Such and other examples of FTIR systems are e.g. disclosed in US6972753, US7432893, US2006/0114237, US2007/0075648, WO2009/048365, WO2010/006882, WO2010/006883, WO2010/006884, WO2010/006885, WO2010/006886 and WO2010/064983, which are all incorporated herein by this reference. The inventive concept may be advantageously applied to such alternative FTIR systems as well.

2. Transmission

As indicated in FIG. 3A, the light will not be blocked by the touching object 7. Thus, if two objects 7 happen to be placed after each other along a light path from an emitter 2 to a sensor 3, part of the light will interact with both objects 7. Provided that the light energy is sufficient, a remainder of the light will reach the sensor 3 and generate an output signal that allows both interactions (touch points) to be identified. Thus, in multi-touch FTIR systems, the transmitted light may carry information about a plurality of touches.

In the following, $T_k$ is the transmission for the k:th detection line, $T_v$ is the transmission at a specific position along the detection line, and $\lambda_v$ is the relative attenuation at the same point. The total transmission (modeled) along a detection line is thus:

$$T_k = \prod_v T_v = \prod_v (1 - \Lambda_v)$$

The above equation is suitable for analyzing the attenuation caused by discrete objects on the touch surface, when the points are fairly large and separated by a distance. However, a more correct definition of attenuation through an attenuating medium may be used:

$$I_k = I_{0,k} \cdot e^{-\int a(x)dx} \longrightarrow T_k = \frac{I_k}{I_{0,k}} = e^{-\int a(x)dx}$$

In this formulation, $I_k$ represents the transmitted energy on detection line $D_k$ with attenuating object(s), $I_{0,k}$ represents the transmitted energy on detection line $D_k$ without attenuating objects, and $a(x)$ is the attenuation coefficient along the detection line $D_k$. We also let the detection line interact with the touch surface along the entire extent of the detection line, i.e. the detection line is represented as a mathematical line.

To facilitate the tomographic reconstruction as described in the following, the measurement values may be divided by a respective background value. By proper choice of background values, the measurement values are thereby converted into transmission values, which thus represent the fraction of the available light energy that has been measured on each of the detection lines.

The theory of the Radon transform (see below) deals with line integrals, and it may therefore be proper to use the logarithm of the above expression:

$$\log(T) = \log(e^{-\int a(x)dx}) = -\int a(x)dx$$

3. Tomographic Techniques

Tomographic reconstruction, which is well-known per se, may be based on the mathematics describing the Radon transform and its inverse. The following theoretical discussion is limited to the 2D Radon transform. The general concept of tomography is to do imaging of a medium by measuring line integrals through the medium for a large set of angles and positions. The line integrals are measured through the image plane. To find the inverse, i.e. the original image, many algorithms use the so-called Projection-Slice Theorem.

Several efficient algorithms have been developed for tomographic reconstruction, e.g. Filtered Back Projection (FBP), FFT-based algorithms, ART (Algebraic Reconstruction Technique), SART (Simultaneous Algebraic Reconstruction Technique), etc. FBP is a widely used algorithm, and there are many variants and extensions thereof. Below, a brief outline of the underlying mathematics for FBP is given, for the sole purpose of facilitating the following discussion about the inventive concept and its merits.

3.1 Projection-Slice Theorem

Many tomographic reconstruction techniques make use of a mathematical theorem called Projection-Slice Theorem. This Theorem states that given a two-dimensional function $f(x, y)$, the one- and two-dimensional Fourier transforms $\mathcal{F}_1$ and $\mathcal{F}_2$, a projection operator $\mathcal{R}$ that projects a two-dimensional (2D) function onto a one-dimensional (1D) line, and a slice operator $S_1$ that extracts a central slice of a function, the following calculations are equal:

$$\mathcal{F}_1 \mathcal{R} f(x,y) = S_1 \mathcal{F}_2 f(x,y)$$

Figure 4:
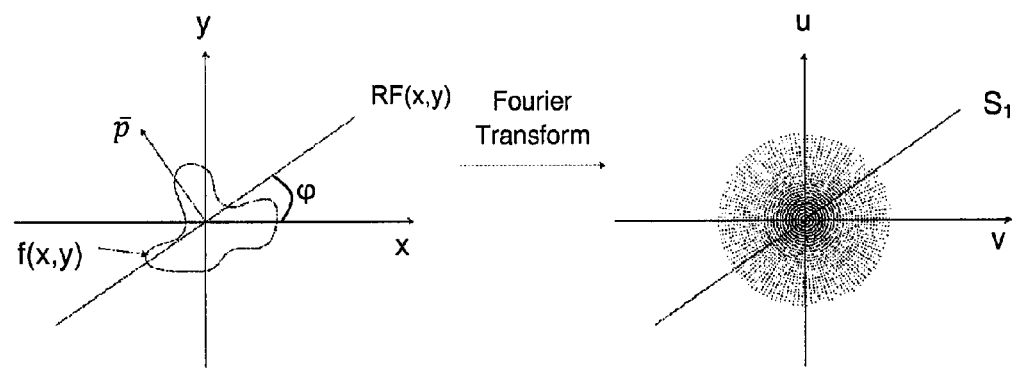
FIG. 4 illustrates the underlying principle of the Projection-Slice Theorem.

This relation is illustrated in FIG. 4. The right-hand side of the equation above essentially extracts a 1D line of the 2D Fourier transform of the function $f(x, y)$. The line passes through the origin of the 2D Fourier plane, as shown in the right-hand part of FIG. 4. The left-hand side of the equation starts by projecting (i.e. integrating along 1D lines in the projection direction $\bar{p}$) the 2D function onto a 1D line (orthogonal to the projection direction $\bar{p}$), which forms a "projection" that is made up of the projection values for all the different detection lines extending in the projection direction $\bar{p}$. Thus, taking a 1D Fourier transform of the projection gives the same result as taking a slice from the 2D Fourier transform of the function $f(x, y)$. In the context of the present disclosure, the function $f(x, y)$ corresponds to the attenuation coefficient field $a(x)$ (generally denoted "attenuation field" herein) to be reconstructed.

3.2 Radon Transform

First, it can be noted that the attenuation vanishes outside the touch surface. For the following mathematical discussion, we define a circular disc that circumscribes the touch surface, $\Omega_r = \{x: |x| \leq r\}$, with the attenuation field set to zero outside of this disc. Further, the projection value for a given detection line is given by:

$$g(\theta, s) = (Ra)(\theta, s) = \int_{s=x\cdot\theta} a(x)dx$$

Here, we let $\theta = (\cos \phi, \sin \phi)$ be a unit vector denoting the direction normal to the detection line, and s is the shortest distance (with sign) from the detection line to the origin (taken as the centre of the screen, cf. FIG. 4).). Note that $\theta$ is perpendicular to the above-mentioned projection direction vector, $\bar{p}$. This means that we can denote $g(\theta, s)$ by $g(\phi, s)$ since the latter notation more clearly indicates that g is a function of two variables and not a function of one scalar and one arbitrary vector. Thus, the projection value for a detection line could be expressed as $g(\phi, s)$, i.e. as a function of the angle of the detection line to a reference direction, and the distance of the detection line to an origin. We let the angle span the range $0 \leq \phi < \pi$, and since the attenuation field has support in $\Omega_r$, it is sufficient to consider s in the interval $-r \leq s \leq r$. The set of projections collected for different angles and distances may be stacked together to form a "sinogram".

Our goal is now to reconstruct the attenuation field $a(x)$ given the measured Radon transform, $g = \mathcal{R}a$. The Radon transform operator is not invertible in the general sense. To be able to find a stable inverse, we need to impose restrictions on the variations of the attenuation field.

One should note that the Radon transform is the same as the above-mentioned projection operator in the Projection-Slice Theorem. Hence, taking the 1D Fourier transform of $g(\phi, s)$ with respect to the s variable results in central slices from the 2D Fourier transform of the attenuation field $a(x)$.

3.3 Continuous Vs. Discrete Tomography

The foregoing sections 3.1-3.2 describe the mathematics behind tomographic reconstruction using continuous functions and operators. However, in a real world system, the measurement data represents a discrete sampling of functions, which calls for modifications of the algorithms. For a thorough description of such modifications, we refer to the mathematical literature, e.g. "The Mathematics of Computerized Tomography" by Natterer, and "Principles of Computerized Tomographic Imaging" by Kak and Slaney.

When operating on discretely sampled functions, certain reconstruction techniques may benefit from a filtering step designed to increase the amount of information about high spatial frequencies. Without the filtering step, the information density will be much higher at low frequencies, and the reconstruction will yield a blurring from the low frequency components.

The filtering step may be implemented as a multiplication/weighting of the data points in the 2D Fourier transform plane. This multiplication with a filter $W_b$ in the Fourier domain may alternatively be implemented as a convolution by a filter $w_b(s)$ in the spatial domain, i.e. with respect to the s variable, using the inverse Fourier transform of the weighting function. The multiplication/weighting function in the 2D Fourier transform plane is rotationally symmetric. Thus, we can make use of the Projection-Slice Theorem to get the corresponding 1D convolution kernel in the projection domain, i.e. the kernel we should use on the projections gathered at specific angles. This also means that the convolution kernel will be the same for all projection angles.

In the literature, several implementations of the filter can be found, e.g. Ram-Lak, Shepp-Logan, Cosine, Hann, and Hamming.

4. Parallel Geometry for Tomographic Processing

Tomographic processing is generally based on standard geometries. This means that the mathematical algorithms presume a specific geometric arrangement of the detection lines in order to attain a desired precision and/or processing efficiency. The geometric arrangement may be selected to enable a definition of the projection values in a 2D sample space, e.g. to enable the above-mentioned filtering in one of the dimensions of the sample space before the back projection, as will be further explained below.

In conventional tomography, the measurement system (i.e. the location of the incoupling points and/or outcoupling points) is controlled or set to yield the desired geometric arrangement of detection lines. Below follows a brief presentation of the parallel geometry, which is standard geometry widely used in conventional tomography e.g. in the medical field.

Figure 5:
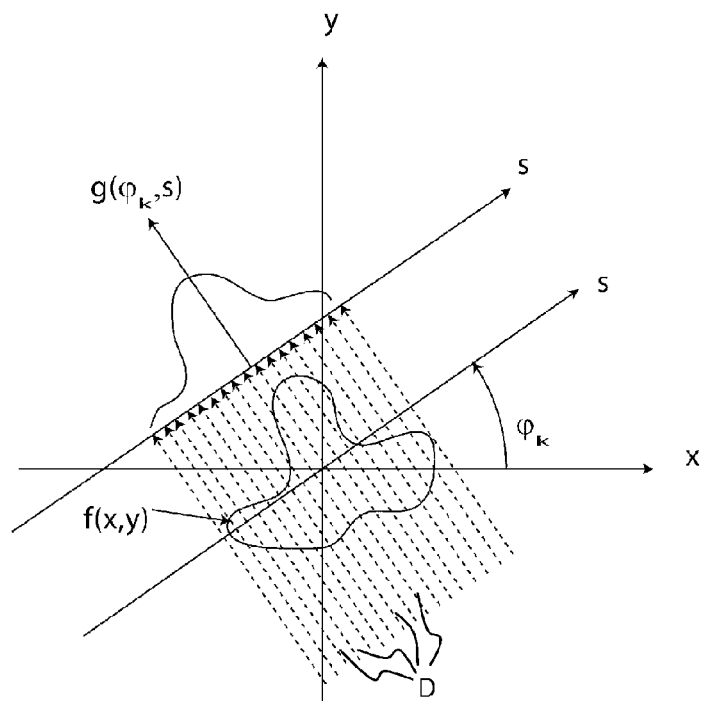
FIG. 5 illustrates a parallel geometry used in tomographic reconstruction.

The parallel geometry is exemplified in FIG. 5. Here, the system measures projection values of a set of detection lines for a given angle $\phi_k$. In FIG. 5, the set of detection lines D are indicated by dashed arrows, and the resulting projection is represented by the function $g(\phi_k, s)$. The measurement system is then rotated slightly around the origin of the x,y coordinate system in FIG. 5, to collect projection values for a new set of detection lines at this new projection angle. As shown by the dashed arrows, all detection lines are parallel to each other for each projection angle $\phi_k$. The system generally measures projection values (line integrals) for angles spanning the range $0 \leq \phi < \pi$.

Figure 6A:
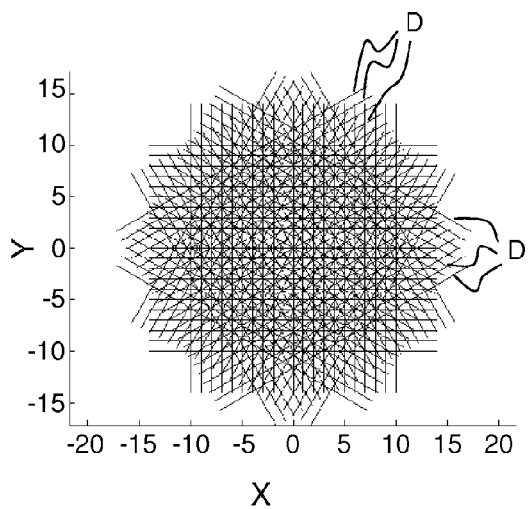
FIGS. 6A-6B are graphs of a regular arrangement of detection lines in a measurement coordinate system and in a sample space, respectively.
Figure 6B:
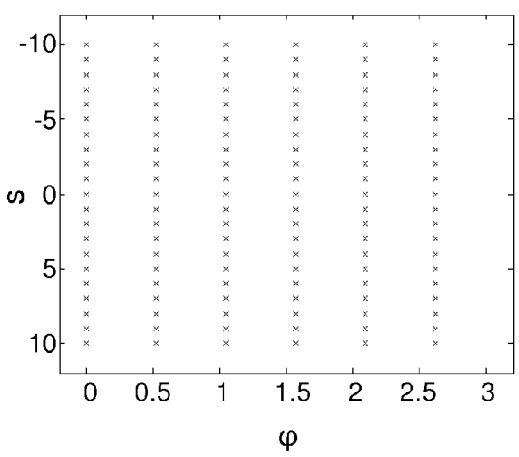

FIG. 6A illustrate the detection lines for six different projection angles in a measurement coordinate system. Existing tomographic reconstruction techniques often make use of the Projection-Slice Theorem, either directly or indirectly, and typically require a uniform sampling of information. The uniformity of sampling may be assessed in a sample space, which is defined by dimensions that uniquely identify each detection line. There are a number of different ways to distinctly define a line; all of them will require two parameters. For a parallel geometry, the two-dimensional sample space is typically defined by the angle parameter $\phi$ and the distance parameter s, and the projection values are represented by $g(\phi, s)$. In FIG. 6A, each detection line defines a sampling point, and FIG. 6B illustrates the locations of these sampling points in the sample space. Clearly, the sampling points are positioned in a regular grid pattern. It should be noted that a true tomographic system typically uses many more projection angles and a denser set of detection lines D.

Below, the use of a parallel geometry in tomographic processing is further exemplified in relation to a known attenuation field shown in FIG. 7A, in which the right-end bar indicates the coding of gray levels to attenuation strength (%). FIG. 7B is a graph of the projection values as a function of distance s for the projection obtained at $\phi=\pi/6$ in the attenuation field of FIG. 7A. FIG. 7C illustrates the sinogram formed by all projections collected from the attenuation field, where the different projections are arranged as vertical sequences of values. For reference, the projection shown in FIG. 7B is marked as a dashed line in FIG. 7C.

The filtering step, i.e. convolution, is now done with respect to the s variable, i.e. in the vertical direction in FIG. 7C. The filtering step results in a filtered sinogram $v=w_b(s)*g(\phi, s)$. As mentioned above, there are many different filter kernels that may be used in the filtering. FIG. 7D illustrates the central part of a discrete filter kernel $w_b(s)$ that is used in this example. As shown, the absolute magnitude of the filter values quickly drops off from the center of the kernel (k=0). In many practical implementations, it is possible to use only the most central parts of the filter kernel, thereby decreasing the number of processing operations in the filtering step.

Since the filtering step is a convolution, it may be computationally more efficient to perform the filtering step in the Fourier domain. For each column of values in the $\phi$-s-plane, a discrete 1D Fast Fourier transform is computed. Then, the thus-transformed values are multiplied by the 1D Fourier transform of the filter kernel. The filtered sinogram v is then obtained by taking the inverse Fourier transform of the result.

Figure 7A:
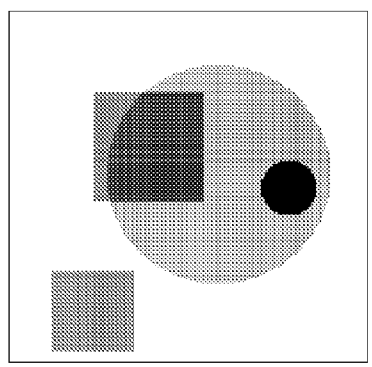
FIGS. 7A-7H illustrate a starting point, intermediate results and final results of a back projection process using a parallel geometry, as well as a filter used in the process.
Figure 7B:
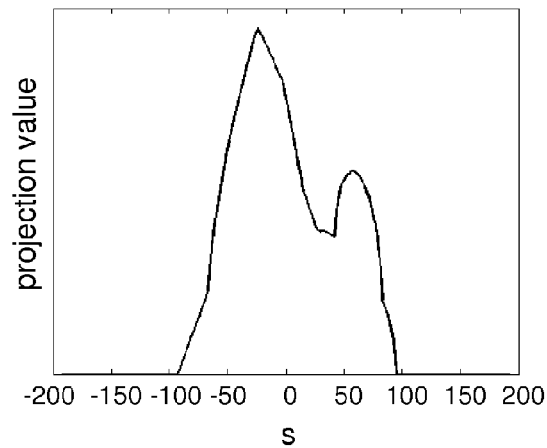
Figure 7C:
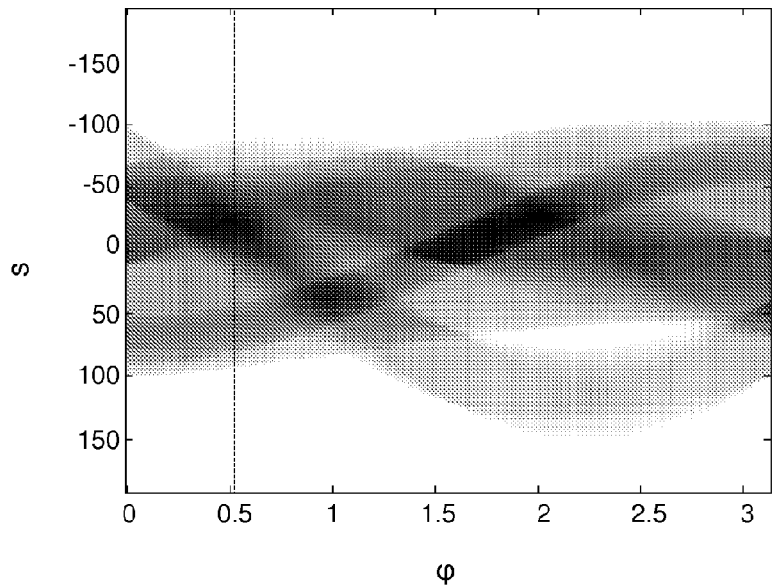
Figure 7D:
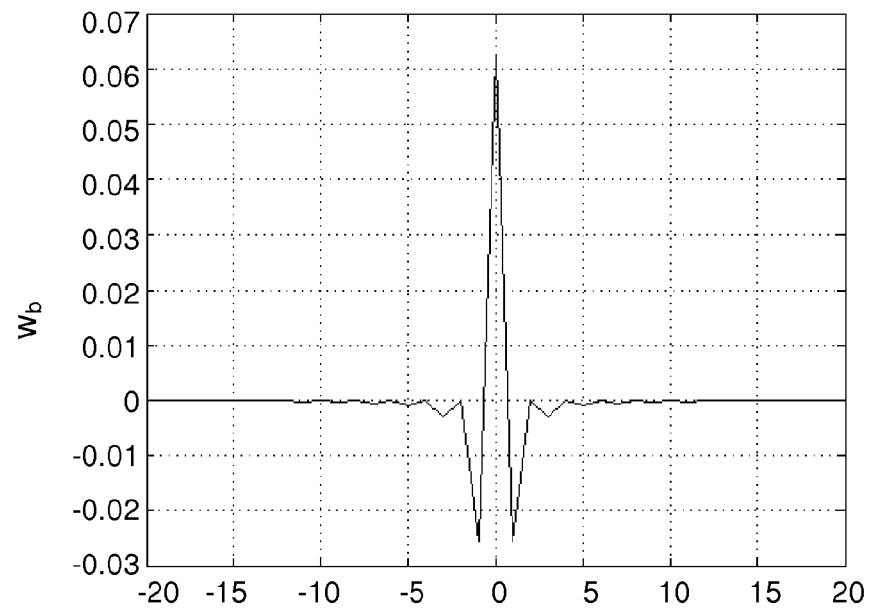
Figure 7E:
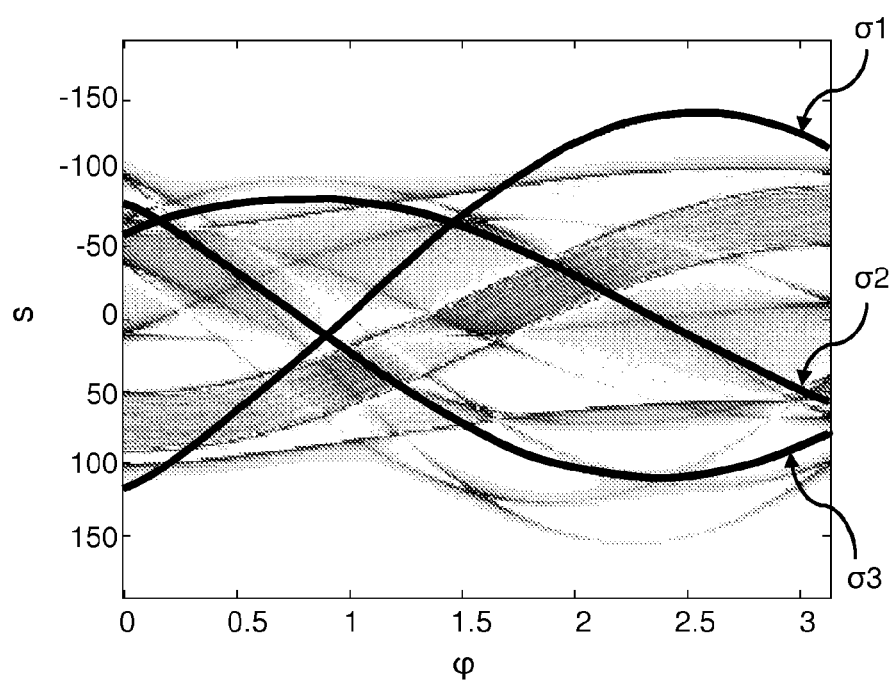

FIG. 7E represents the filtered sinogram that is obtained by operating the filter kernel in FIG. 7D on the sinogram in FIG. 7C. For illustration purposes, FIG. 7E shows the absolute values of the filtered sinogram, with zero being set to white and the magnitude of the filtered values being represented by the amount of black.

The next step is to apply the back projection operator $\mathcal{R}^{\#}$. Fundamental to the back projection operator is that a single position in the attenuation field is represented by a sine function in the sinogram. Thus, to reconstruct each individual attenuation value in the attenuation field, the back projection operator corresponds to a summation of the values of the filtered sinogram along the corresponding sine function. This can be expressed as $$(\mathcal{R}^{\#}v)(x_i) = 2\sum_{j=0}^{p-1} v(\varphi_j, x_i \cdot \theta_j),$$

where $\theta=(\cos \phi_j, \sin \phi_j)$, p is the number of projection angles, and $x_i=(x_i, y_i)$ is a point in the attenuation field (i.e. a location on the touch surface 1).

To illustrate this concept, FIG. 7E shows three sine curves $\sigma_1$-$\sigma_3$ (indicated by superimposed thick black lines) that correspond to three different positions in the attenuation field of FIG. 7A.

Figure 7F:
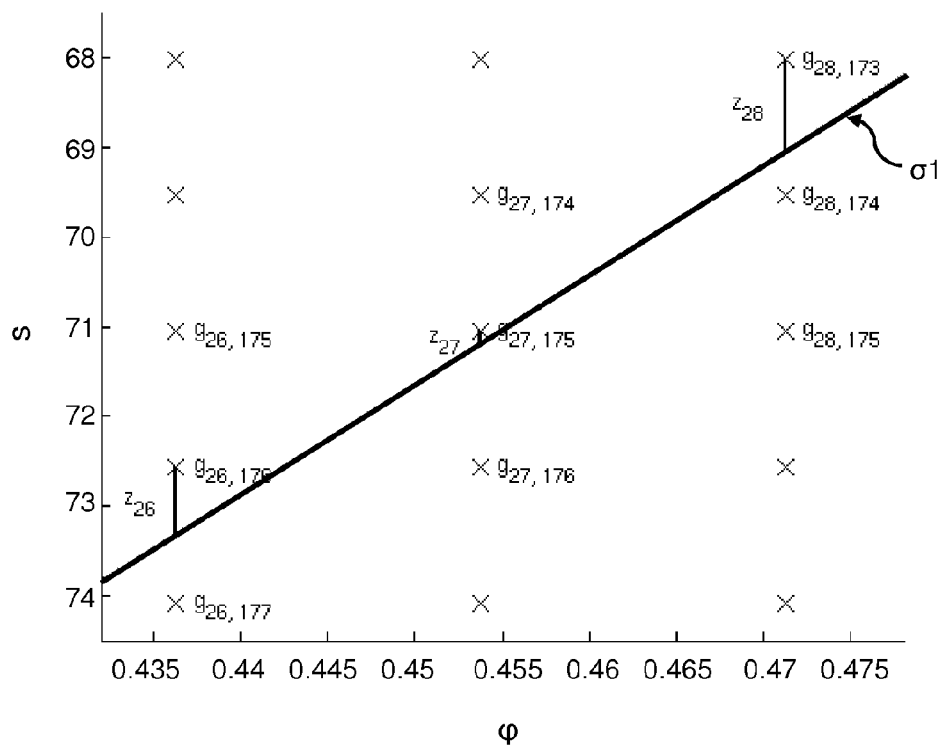

Since the location of a reconstructed attenuation value will not coincide exactly with all of the relevant detection lines, it may be necessary to perform linear interpolation with respect to the s variable where the sine curve crosses between two sampling points. The interpolation is exemplified in FIG. 7F, which is an enlarged view of FIG. 7E and in which x indicates the sampling points, which each has a filtered projection value. The contribution to the back projection value for the sine curve $\sigma_1$ from the illustrated small part of the $\phi$-s-plane becomes:

$$(1-z_{26})\cdot(w^*g)_{26,176}+z_{26}\cdot(w^*g)_{26,177}$$

$$+(1-z_{27})\cdot(w^*g)_{27,175}+z_{27}\cdot(w^*g)_{27,176}$$

$$+(1-z_{28})\cdot(w^*g)_{28,173}+z_{28}\cdot(w^*g)_{28,174}$$

The weights $z_i$ in the linear interpolation is given by the normalized distance from the sine curve to the sampling point, i.e. $0 \leq z_i < 1$.

By using linear interpolation in the back projection operator, the time complexity of the reconstruction process is $O(n^3)$, where n may indicate the number of incoupling and outcoupling points on one side of the touch surface, or the number of rows/columns of reconstruction points (see below).

An alternative approach is to compute the filtered values at the crossing points by applying individual filtering kernels. The time complexity of such a reconstruction process is $O(n^4)$.

Figures 7G, 7H:
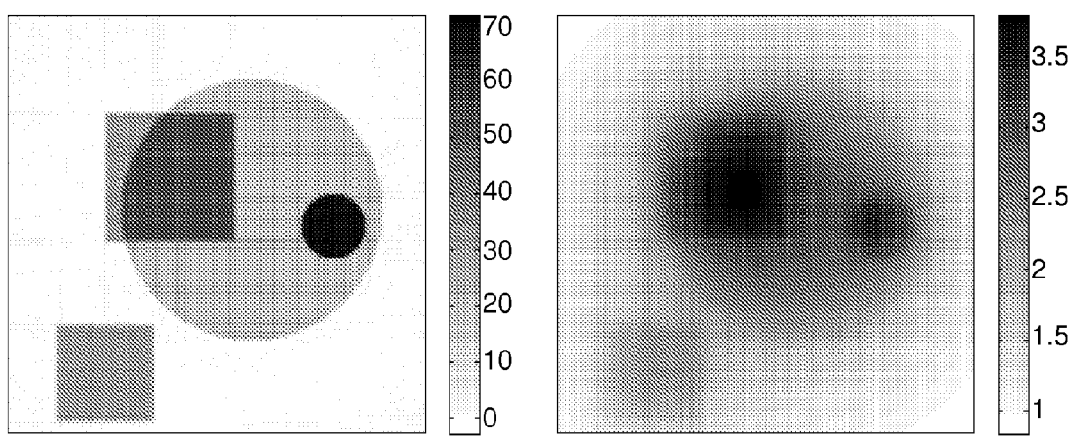

FIG. 7G shows the reconstructed attenuation field that is obtained by applying the back projection operator on the filtered sinogram in FIG. 7E. It should be noted that the filtering step may be important for the reconstruction to yield useful data. FIG. 7H shows the reconstructed attenuation field that is obtained when the filtering step is omitted.

Figure 8A:
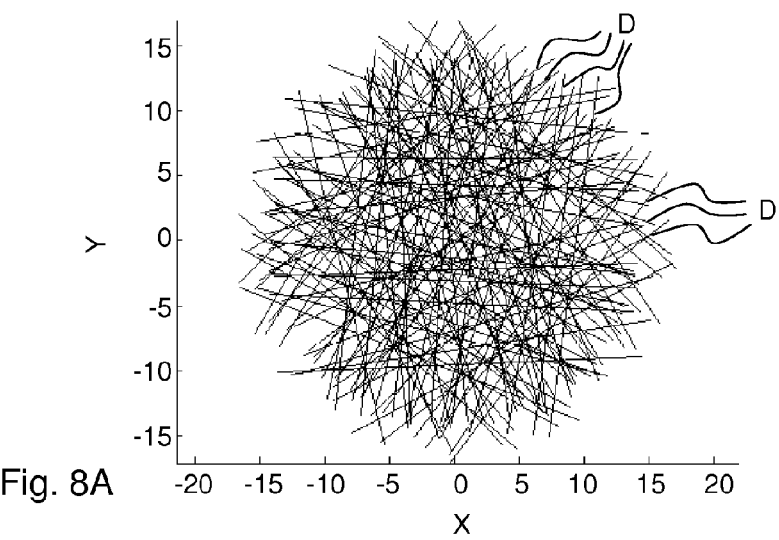
FIGS. 8A-8B are graphs of a non-regular arrangement of detection lines in the coordinate system of a touch surface and in a sample space, respectively.
Figure 8B:
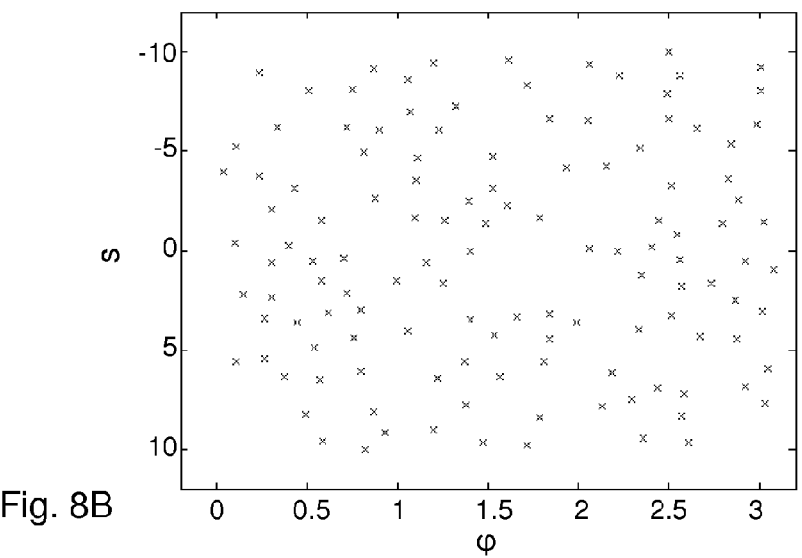

The standard techniques for tomographic processing as described above presume a regular arrangement of the sampling points in the $\phi$-s-plane, e.g. as exemplified in FIG. 6B. However, it is difficult if not impossible to design a touch-sensitive apparatus with a regular arrangement of sampling points, since it is non-trivial to position the incoupling and outcoupling points so as to reproduce a perfect parallel geometry of detection lines. Thus, compared to the desired regular arrangement in FIG. 6A, the detection lines typically form an irregular pattern on the touch surface, such as exemplified in FIG. 8A. The corresponding arrangement of sampling points (marked by x) in the sample space is also highly irregular, as illustrated in FIG. 8B. Two nearby sampling points in the sample space correspond to two detection lines that are close to each other on the touch surface and/or that have a small difference in projection angle (and may thus be overlapping, with a small mutual angle, in some part of the touch surface).

Figure 9:
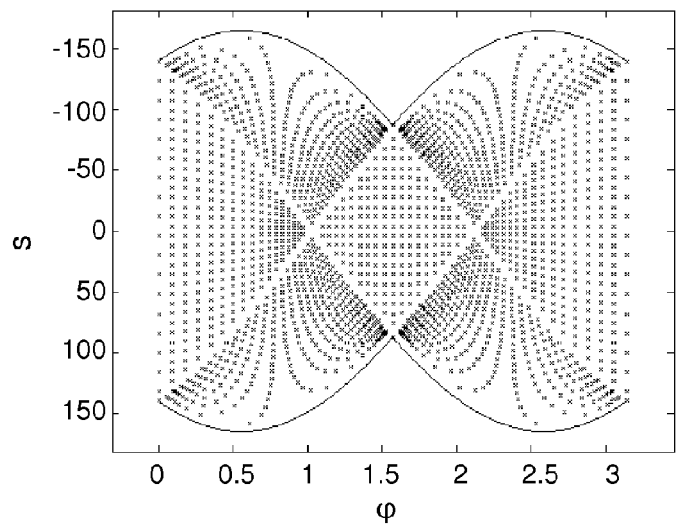
FIG. 9 is a graph of sampling points defined by the interleaved arrangement in FIG. 2.

As a further example of irregular sampling points, FIG. 9 illustrates the sampling points in the $\phi$-s-plane for the interleaved system shown in FIG. 2. In FIG. 9, the solid lines indicate the physical limits of the touch surface. It can be noted that the angle $\phi$ actually spans the range from 0 to $2\pi$, since the incoupling and outcoupling points extend around the entire perimeter. However, a detection line is the same when rotated by $\pi$, and the projection values may thus be rearranged to fall within the range of 0 to $\pi$. However, this rearrangement is optional.

The inventors have realized that the standard techniques for tomographic processing cannot be used to reconstruct the attenuation field a(x) on the touch surface, at least not with adequate precision, due to the irregular sampling.

5. Use of Tomographic Processing for Touch Determination

In its various aspects, the invention relates to ways of re-designing tomographic techniques so as to accommodate for irregular sampling, viz. such that the tomographic techniques use the same amount of information from all relevant parts of the sample space. In various embodiments, this is achieved by introducing an adjustment factor, $\rho_k$, which represents the local density of sampling points in the sample space. By clever use of the adjustment factor, it is possible to adapt existing tomographic techniques so as to enable reconstruction of the attenuation field for arbitrary patterns of detection lines on the touch surface, i.e. also including non-uniform arrangements of sampling points in the sample space.

Figure 10A:
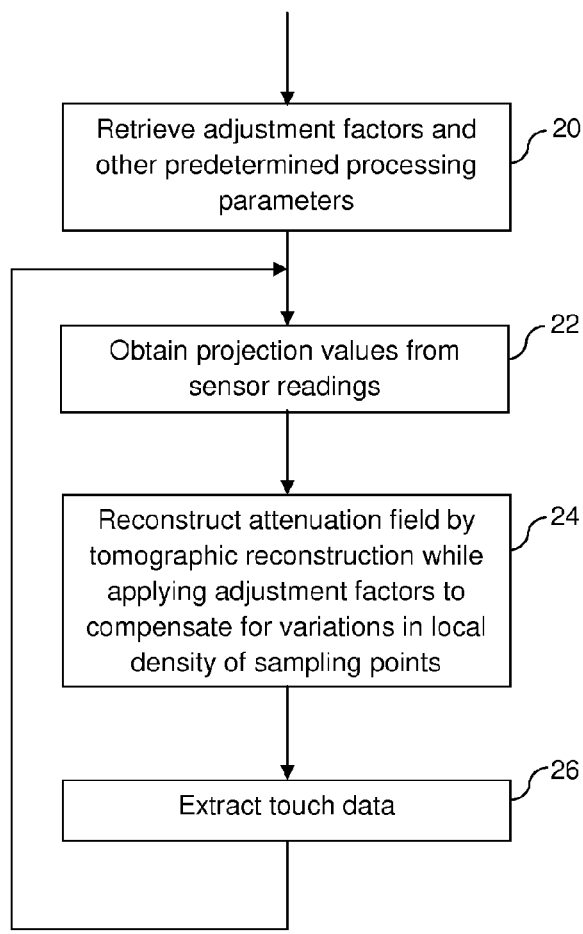
FIG. 10A is a flow chart of a reconstruction method.

FIG. 10A illustrates an embodiment of a method for reconstruction and touch data extraction in an touch-sensitive apparatus, such as the above-described FTIR system. The method involves a sequence of steps 22-26 that are repeatedly executed, typically by the signal processor 10 (FIGS. 1 and 3). In the context of this description, each sequence of steps 22-26 is denoted a sensing instance.

In a preparatory step 20, the signal processor obtains adjustment factors, and possibly other processing parameters (coefficients), to be used in the tomographic reconstruction. In one embodiment, the adjustment factors are pre-computed and stored on an electronic memory, and the signal processor retrieves the pre-computed adjustment factors from the memory. Each adjustment factor is computed to be representative of the local density of data samples in the sample space for a respective sampling point. This means that each detection line is associated with one or more adjustment factors. In a variant (not shown), the signal processor obtains the adjustments factors by intermittently re-computing or updating the adjustment factors, or a subset thereof, during execution of the method, e.g. every n:th sensing instance. The computation of adjustment factors will be further exemplified in Chapter 6.

Each sensing instance starts by a data collection step 22, in which measurement values are sampled from the light sensors 2 in the FTIR system, typically by sampling a value from each of the aforesaid sub-signals. The data collection step 22 results in one projection value for each detection line (sampling point). It may be noted that the data may, but need not, be collected for all available detection lines in the FTIR system. The data collection step 22 may also include pre-processing of the measurement values, e.g. filtering for noise reduction, conversion of measurement values into transmission values (or equivalently, attenuation values), conversion into logarithmic values, etc.

In a reconstruction step 24, an "attenuation field" across the touch surface is reconstructed by processing of the projection data from the data collection step 22. The attenuation field is a distribution of attenuation values across the touch surface (or a relevant part of the touch surface), i.e. an energy-related parameter. As used herein, "the attenuation field" and "attenuation values" may be given in terms of an absolute measure, such as light energy, or a relative measure, such as relative attenuation (e.g. the above-mentioned attenuation coefficient) or relative transmission. The reconstruction step operates a tomographic reconstruction algorithm on the projection data, where the tomographic reconstruction algorithm is designed to apply the adjustment factors to at least partly compensate for variations in the local density of sampling points in the sample space.

The tomographic processing may be based on any known algorithm for tomographic reconstruction. The tomographic processing will be further exemplified in Chapter 7 with respect to algorithms for Back Projection, algorithms based on Fourier transformation and algorithms based on Hough transformation.

The attenuation field may be reconstructed within one or more subareas of the touch surface. The subareas may be identified by analyzing intersections of detection lines across the touch surface, based on the above-mentioned projection signals. Such a technique for identifying subareas is further disclosed in WO2011/049513 which is incorporated herein by this reference.

In a subsequent extraction step 26, the reconstructed attenuation field is processed for identification of touch-related features and extraction of touch data. Any known technique may be used for isolating true (actual) touch points within the attenuation field. For example, ordinary blob detection and tracking techniques may be used for finding the actual touch points. In one embodiment, a threshold is first applied to the attenuation field, to remove noise. Any areas with attenuation values that exceed the threshold, may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, etc.

Any available touch data may be extracted, including but not limited to x,y coordinates, areas, shapes and/or pressure of the touch points.

After step 26, the extracted touch data is output, and the process returns to the data collection step 22.

It is to be understood that one or more of steps 20-26 may be effected concurrently. For example, the data collection step 22 of a subsequent sensing instance may be initiated concurrently with step 24 or 26.

Figure 10B:
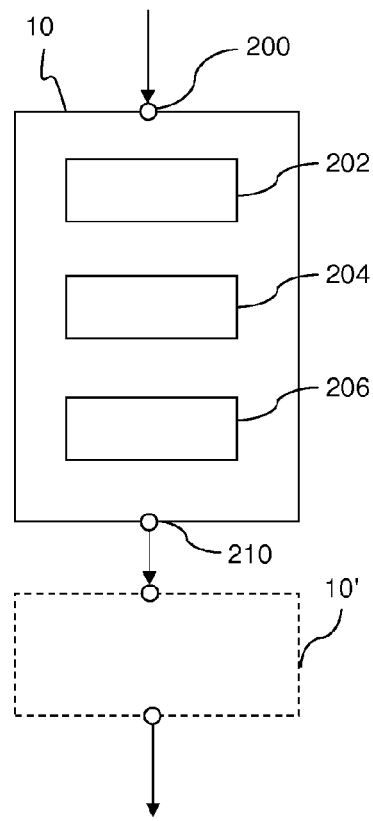
FIG. 10B is a block diagram of a device that implements the method of FIG. 10A.

The touch data extraction process is typically executed by a data processing device (cf. signal processor 10 in FIGS. 1 and 3) which is connected to sample the measurement values from the light sensors 3 in the FTIR system. FIG. 10B shows an example of such a data processing device 10 for executing the process in FIG. 10A. In the illustrated example, the device 10 includes an input 200 for receiving the output signal. The device 10 further includes a parameter retrieval element (or means) 202 for retrieving the adjustment factors (or depending on implementation, for computing/updating the adjustment factors), a data collection element (or means) 204 for processing the output signal to generate the above-mentioned set of projection values, a reconstruction element (or means) 206 for generating the reconstructed attenuation field by tomographic processing, and an output 210 for outputting the reconstructed attenuation field. In the example of FIG. 10B, the actual extraction of touch data is carried out by a separate device 10' which is connected to receive the attenuation field from the data processing device 10.

The data processing device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, and the adjustment factors, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the data processing device 10 on any suitable computer-readable medium, including a record medium, a read-only memory, or an electrical carrier signal.

6. Computation of Adjustment Factors

In this chapter we introduce the concept of "density of detection lines", which is a measure of the angular and spatial distribution of detection lines on the touch surface. Recalling that a detection line is equivalent to a sampling point in the sampling space, the density of detection lines may be given by the density of sampling points (cf. FIG. 8B and FIG. 9). The local density of detection lines is used for computing an adjustment factor $\rho_k$ for each individual detection line. The adjustment factor $\rho_k$ may be a constant for each detection line or, in some examples, a function for each detection line. In the following examples, it should be noted that the attenuation factor $\rho_k$ may be scaled to get appropriate scaling of the reconstructed attenuation field.

There are many different ways of generating a measure of the local density of sampling points, to be used for calculating the adjustment factors for the tomographic processing. Below, a few examples are listed.

Use of the number of nearby sampling points, i.e. to measure the number of sampling points that fall within a distance from the detection line (sampling point) of interest in the sample space.

Use of the average distance, i.e. to measure the average of the N smallest distances in the sample space between the detection line (sampling point) and its neighbors.

Use of Voronoi areas, i.e. to obtain the extent of a Voronoi cell for each detection line (sampling point) in the sample space.

Use of Delaunay triangles, i.e. to obtain the areas of the Delaunay triangles associated with the detection lines (sampling points) in the sample space.

Use of interpolating basis functions, i.e. to assign a density-dependent two-dimensional basis function to each detection line (sampling point) in the sample space, and evaluate the interaction between the basis function and a number of reconstruction curves in the sample space, where each reconstruction curve corresponds to a spatial point on the touch surface. The reconstruction curve may e.g. be given by the aforesaid back projection operator ($\mathfrak{R}^{\#}$).

Each of these examples will now be described in further detail in separate sections 6.1-6.5. It should be noted that in these, and all other examples, the adjustment factors may be (and typically are) pre-computed and stored for retrieval during touch determination (cf. step 20 in FIG. 10A).

6.1 Number of Nearby Sampling Points ($\rho_k^\lambda$)

The local density for a specific detection line may be determined by finding the number of detection lines that fall within a given distance $\lambda$ from the specific detection line. The distance is measured in the sample space, i.e. the φ-s-plane. To facilitate the definition of distance, it may be preferable to at least approximately normalize the dimensions (φ, s) of the sample space. For example, if the projection angle spans 0≤φ<π, the distance s may be scaled to fall within the same range. The actual scaling typically depends on the size of the touch system, and theoretical recommendations are found in the literature.

Figure 11A:
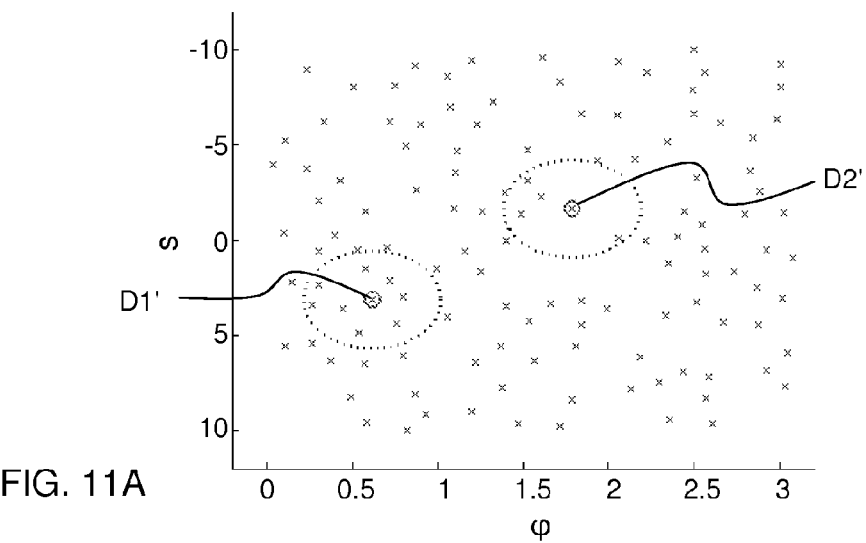
FIGS. 11A-11B illustrate a first embodiment for determining adjustment factors.
Figure 11B:
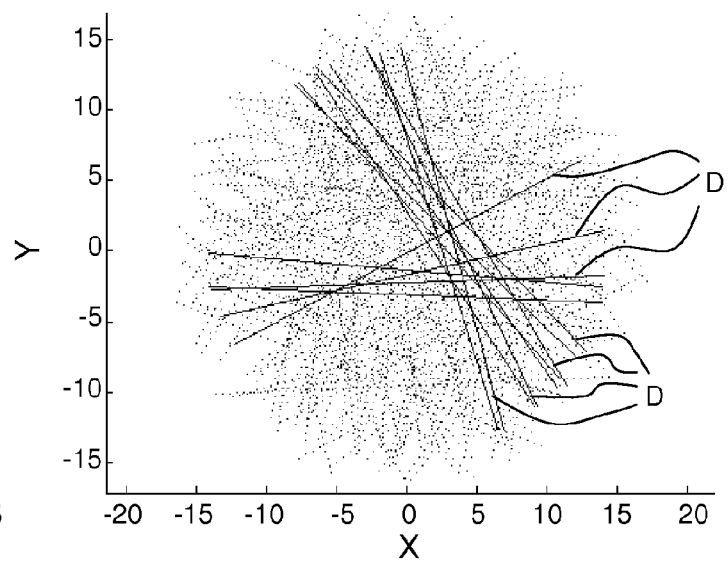

FIG. 11A illustrates the determination of local density for two detection lines (sampling points) $D_1'$, $D_2'$. The given distance ($\lambda$=0.4) is marked by a dotted circle around the respective detection line $D_1'$, $D_2'$. In this example, $D_1'$, $D_2'$ have 9 and 5, respectively, nearby detection lines (counting also $D_1'$ and $D_2'$, respectively). For comparison, FIG. 11B illustrate two groups of detection lines on the touch surface that fall within the respective dotted circle in FIG. 11A. The radii of the circles may e.g. be chosen to correspond to the expected height (with respect to the s dimension) of a touch. It should also be noted that the value of $\lambda$=0.4 is merely given as an example, and that the given distance $\lambda$ may be set to a smaller value in an actual touch system.

The adjustment factor is proportional to the inverse of the number of nearby detection lines, i.e. ⅑ and ⅕, respectively. This means that a lower weight will be given to information from several detection lines that represent almost the same information in the attenuation field.

In this example, the adjustment factor is denoted $\rho_k^\lambda$ and is computed according to:

$$\rho_k^\lambda = \frac{1}{\text{number of detection lines where } |(\varphi_k, s_k) - (\varphi_i, s_i)| < \lambda}.$$

6.2 Average Distance ($\rho_k^N$)

Figure 12:
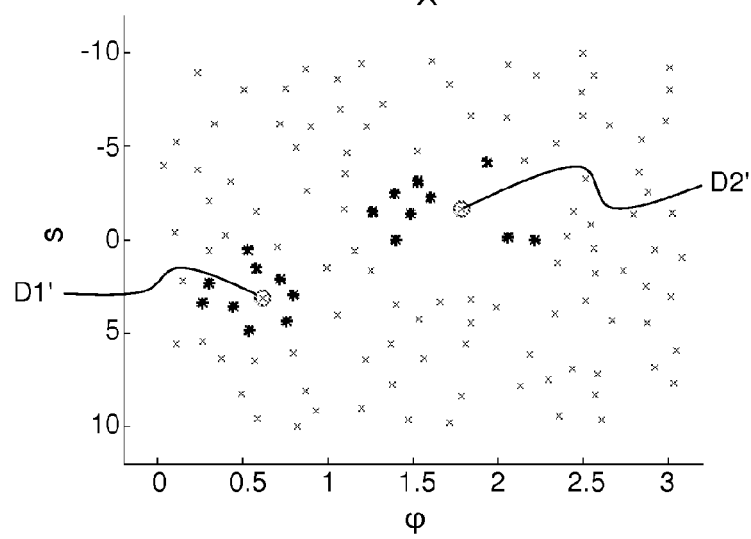
FIG. 12 illustrate a second embodiment for determining adjustment factors.

The local density for a specific detection line may be determined by computing the distance to the N closest detection lines. FIG. 12 illustrates the determination of local density for two detection lines (sampling points) $D_1'$, $D_2'$. The nearest neighbors are marked by stars (*) around the respective detection line $D_1'$, $D_2'$. In this example, $D_1'$, $D_2'$ yield the average distances 0.27 and 0.39, respectively, for N=9.

In this example, the adjustment factor is denoted $\rho_k^N$ and is computed according to:

$$\rho_k^N = \frac{1}{N} \sum_{i \in N_k} |(\varphi_k, s_k) - (\varphi_i, s_i)|,$$

where $N_k$ is the set of detection lines closest to detection line k.

6.3 Voronoi Areas ($\rho_k^{VA}$)

The adjustment factors may be computed based on the extent of the Voronoi cell (as measured in the sample space) of the detection line. Voronoi cells are obtained by defining the sampling points in the sample space as Voronoi sites in a Voronoi diagram. A Voronoi diagram is a well-known mathematical technique to decompose a metric space based on distances to a specified discrete set of objects in the space.

Specifically, a site in the Voronoi diagram has a Voronoi cell which contains all points that are closer to the site than to any other site.

Figure 13:
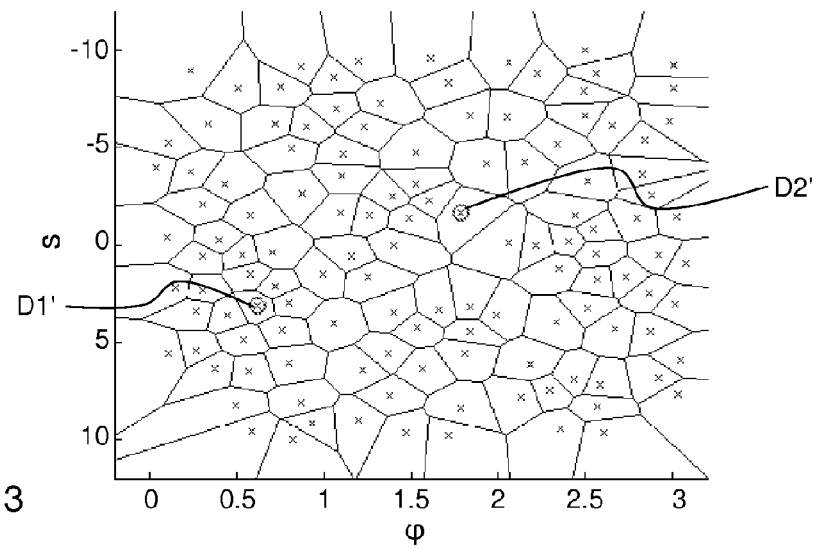
FIG. 13 illustrate a third embodiment for determining adjustment factors.

FIG. 13 illustrates the Voronoi diagram for the sample space in FIG. 8B. The detection lines (sampling points) $D_1'$, $D_2'$ have the areas 0.0434 and 0.1334, respectively.

It may be advantageous to normalize the adjustment factors such that the total area equals a given value e.g. unity. Special care may need to be taken when defining Voronoi cells at the edge of the sample space, since these cells will have an infinite area unless a constraint is added for the size of these cells. When the sample space is IL-periodic, it may be sufficient to only add constraint edges respect to the s dimension if the sample points are properly mirrored between $\phi=0$ and $\phi=\pi$.

The adjustment factor is denoted $\rho_k^{VA}$ and is computed according to:

$$\rho_k^{VA} = \text{voronoi\_area}((\phi_k, s_k)).$$

Compared to $\rho_k^\lambda$ and $\rho_k^N$, the computation of $\rho_k^{VA}$ obviates the need to set potentially arbitrary computation parameters, such as the distance $\lambda$ in the sample space and the number N and the definition of neighboring sampling points.

6.4 Delaunay Triangles ($\rho_k^{DA}$)

The adjustment factors may be computed based on the extent of the Delaunay triangles (in the sample space) for the detection line. The Delaunay triangles are obtained by defining the sampling points as corners of a mesh of non-overlapping triangles and computing the triangles using the well-known Delaunay algorithm. To achieve triangles with reduced skewness, if deemed necessary, the dimensions of the sample space ($\phi$,s) may be rescaled to the essentially same length before applying the Delaunay triangulation algorithm.

Figure 14:
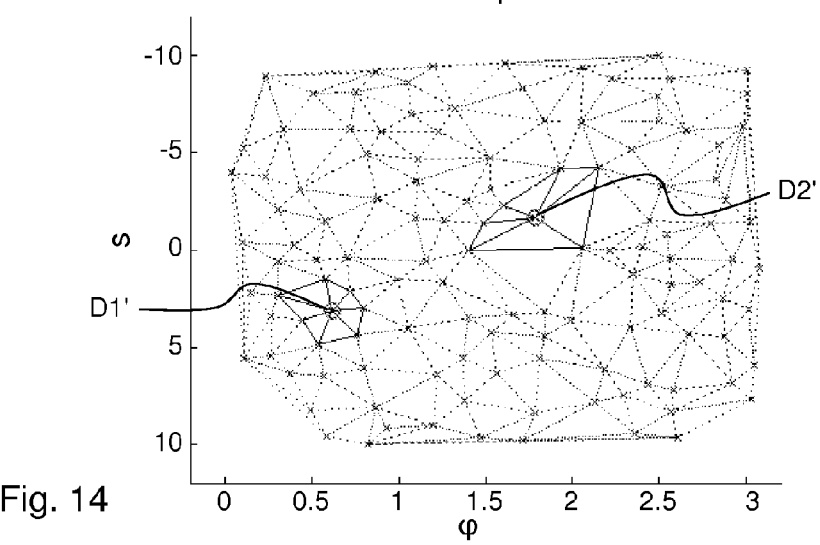
FIG. 14 illustrate a fourth embodiment for determining adjustment factors.

FIG. 14 illustrates the Delaunay triangulation for the sample space in FIG. 8B. The adjustment factor for a detection line is given by the total extent of all triangles that include the detection line. The detection lines (sampling points) $D_1'$, $D_2'$ have the areas 0.16 and 0.32, respectively.

In this example, the adjustment factor is denoted $\rho_k^{DA}$ and is computed according to:

$$\rho_k^{DA} = \text{delaunay\_area}((\phi_k, s_k)).$$

6.5 Interpolating Basis Functions

By assigning a density-dependent basis function to each detection line (in the sample space) and evaluating the reconstruction algorithm for each basis function separately, it is possible to compute high precision adjustment factors. One major benefit of using basis functions is that they enable the use of higher order interpolation when computing the adjustment factor for each detection line. The following examples are all given for reconstruction algorithms that are based on the back projection operation ($\mathfrak{R}^\#$). In the following example, the basis functions are defined based on Delaunay triangles for each detection line (in the sample space), but it should be understood that any density-dependent basis function could be used.

6.5.1 Line Integrals ($\rho_{k,i}^{D1}, \rho_{k,i}^{V0}$)

Figure 15:
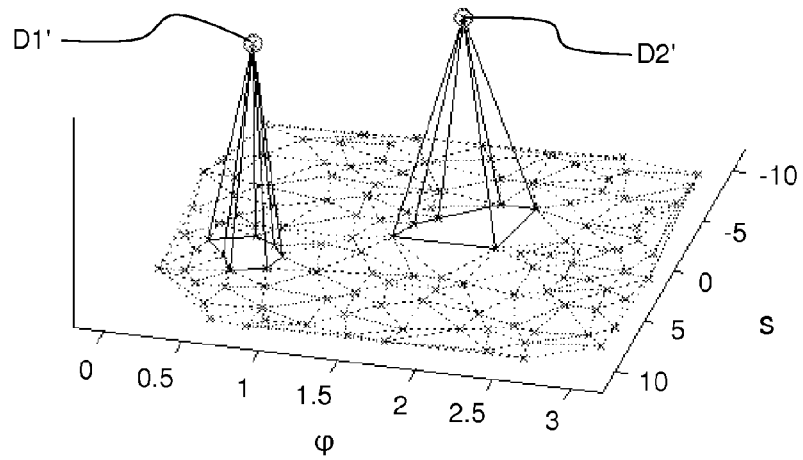
FIG. 15 illustrate the concept of interpolating basis functions.

FIG. 15 shows two basis functions defined based on Delaunay triangles (cf. FIG. 15) for two detection lines (sampling points) $D_1'$, $D_2'$. The basis functions suitably have the same height (strength) at the sampling points, e.g. unity. Since the basis function is given by Delaunay triangles, the base of each basis function is automatically adjusted to the local density of sampling points. The adjustment factors for each detection line may be computed as the interaction between the interpolating basis function and the back projection operator. In the illustrated example, the basis functions are defined to be linearly interpolating, but other interpolations can be achieved, such as nearest neighbor interpolation, second order interpolation or higher, continuously differentiable interpolation, etc. It is also conceivable to define the basis functions based on the Voronoi cells of the sampling points (cf. FIG. 15), which will yield a zero order interpolation, i.e. a top hat function. As will be explained below, the use of basis functions often results in the adjustment factor for each detection line being a function instead of a single value.

In the following, a first order interpolating Delaunay triangle basis function is denoted $b_k^{D1}$.

Figure 16:
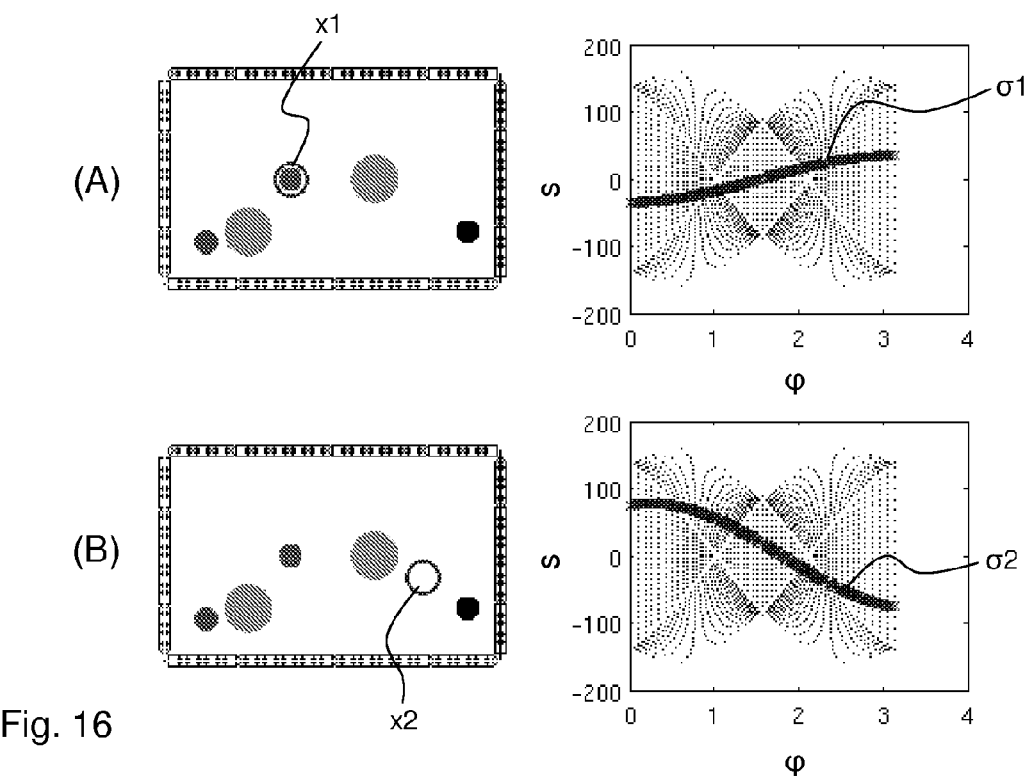
FIGS. 16A-16B illustrate a correspondence between reconstruction points on the touch surface and reconstruction lines in the sample space.

Before exemplifying the computation of adjustment factors, it is to be recalled that a reconstruction point in the attenuation field corresponds to a reconstruction line (curve) in the sample space. As explained above (Chapter 4), the reconstruction line is a sine curve for the back projection operator. This is further illustrated in FIGS. 16A-16B, where the left-hand part indicates two different reconstruction points $x_1$, $x_2$ on the touch surface and the right-hand part illustrates the corresponding reconstruction lines $\sigma_1$, $\sigma_2$ in the sample space.

Figure 17A:
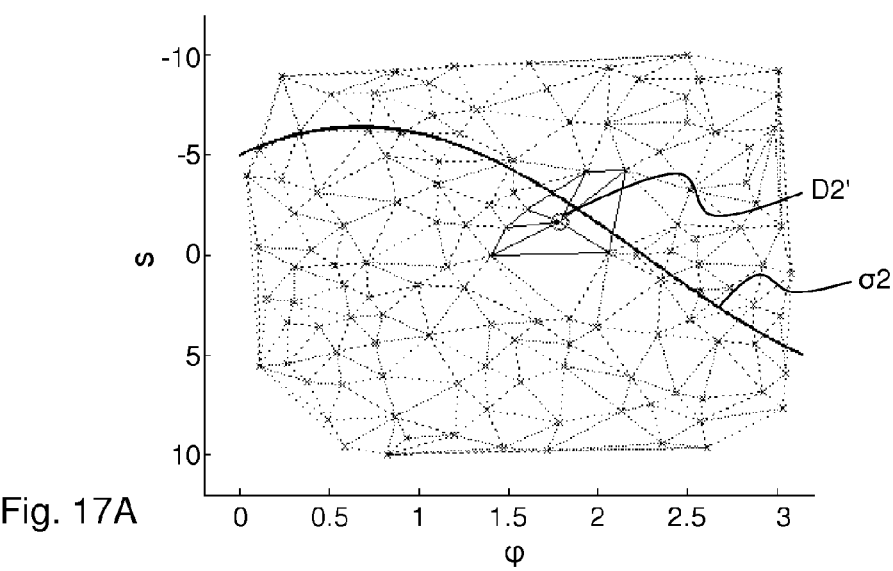
FIGS. 17A-17D illustrate the interaction between a reconstruction line and an interpolating basis function.
Figure 17B:
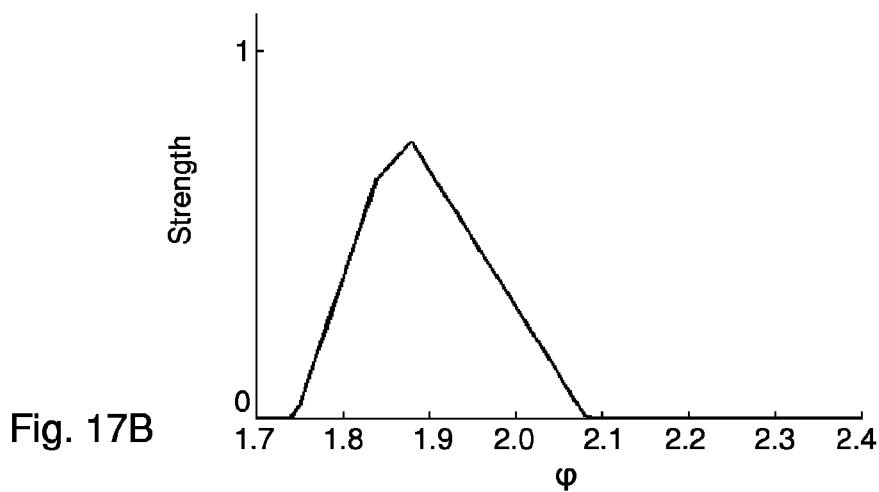

The adjustment factors for a given detection line (sampling point) with respect to a reconstruction line may be computed by evaluating the line integral for the reconstruction line running through the basis function. The reconstruction line $\sigma_i$ is defined by $\sigma_i = (\phi, x_i \cdot \theta)$, where $\theta = (\cos\phi, \sin\phi)$ and $x_i = (x_i, y_i)$ is the reconstruction point on the touch surface that corresponds to the reconstruction line. FIG. 17A illustrates the interaction between the reconstruction line $\sigma_2$ and the basis function for detection line (sampling point) $D_2'$. FIG. 17B is a graph of the values of the basis function along the reconstruction line $\sigma_2$ with respect to the $\phi$ dimension. The line integral, evaluated with respect to the $\phi$ dimension, is 0.135 in this example. It can be noted that the top value in FIG. 17B does not reach a value of unity since the reconstruction line passes at a distance from the sampling point $D_2'$. In variant, the line integral may, e.g., be evaluated with respect to the length of the reconstruction line $\sigma_2$, i.e. in both dimensions s, $\phi$.

Figure 17C:
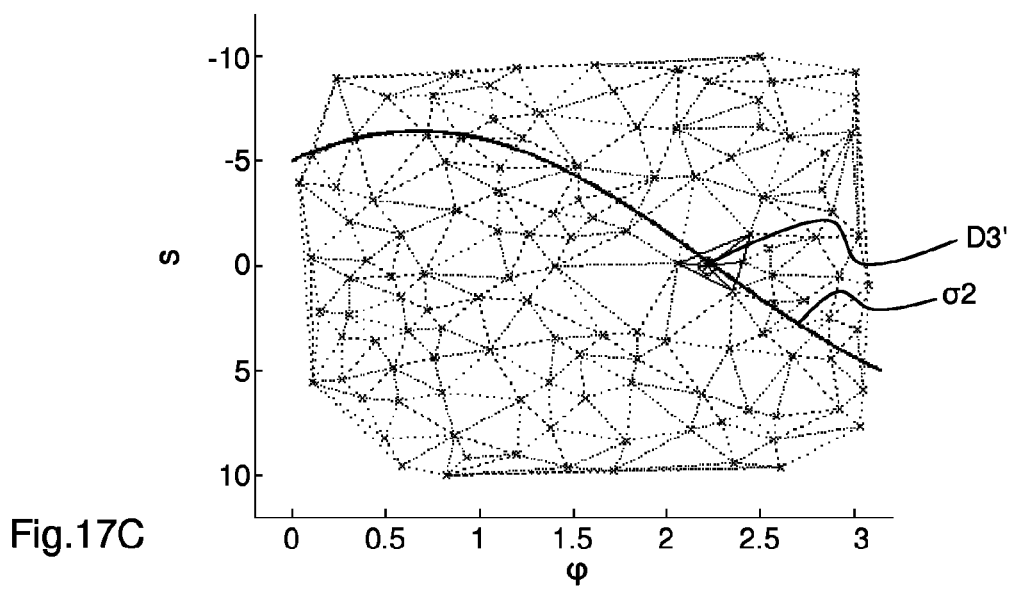
Figure 17D:
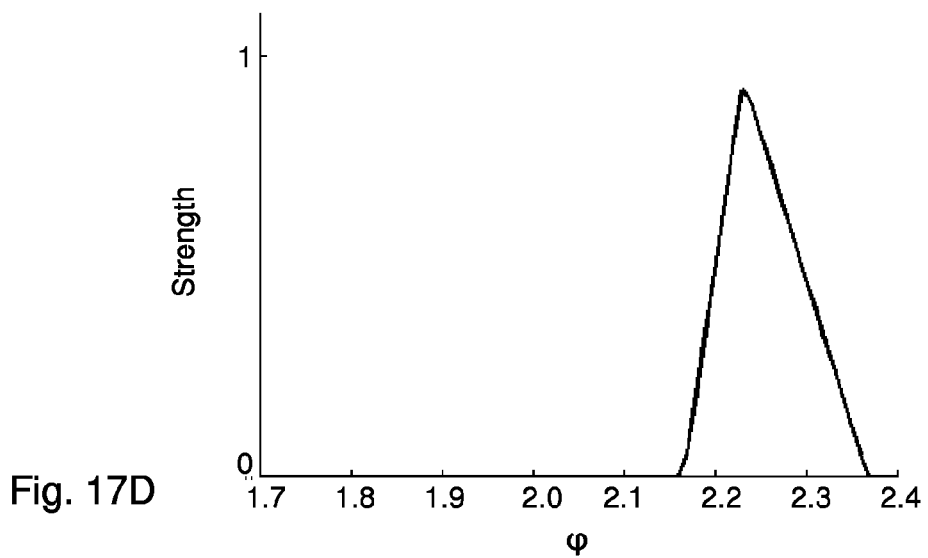

FIG. 17C illustrates the interaction between the reconstruction line $\sigma_2$ and the basis function for another detection line (sampling point) $D_3'$, and FIG. 17D is a graph of the values of the basis function along the reconstruction line $\sigma_2$ with respect to the $\phi$ dimension. The line integral, evaluated with respect to the $\phi$ dimension, is 0.095 in this example. It should be noted that the line integral is smaller for sampling point $D_3'$ than for sampling point $D_2'$, even though the reconstruction line $\sigma_2$ lies closer to sampling point $D_3'$. This illustrates how the use of basis functions compensates for the varying density of detection lines. Detection lines in a high density area will yield a basis function with a smaller base than detection lines in sparse areas. In this example, the adjustment factor is denoted $\rho_{k,i}^{D1}$ and is computed according to:

$$\rho_{k,i}^{D1} = \int b_k^{D1}(\phi, x_i \cdot \theta) d\phi.$$

In an alternative embodiment, the basis functions are defined based on the Voronoi cells of the sampling points. In such an example, the adjustment factor is denoted $\rho_{k,i}^{V0}$ and is computed according to:

$$\rho_{k,i}^{V0} = \int b_k^{V0}(\phi, x_i \cdot \theta) d\phi,$$

with $b_k^{V0}$ being the zero-order interpolating Voronoi basis function.

It should be noted that $\Sigma_k b_k^{D1}(\phi, s)$ is set to a fixed value, e.g. 1, for all values of $(\phi, s)$ that fall within the valid region of sample space. This equation should hold for all relevant basis functions.

6.5.2 Surface Integrals ($\rho_{k,i}^{wD1}, \rho_{k,i}^{wV0}$)

Below, the computation of an advanced adjustment factor will be exemplified, specifically an adjustment factor for a sampling point to be processed for tomographic reconstruction using back projection and filtering. In this case, the computation is not limited to evaluating line integrals for the interaction between the basis function and the reconstruction line. Instead, a two-dimensional (surface) integral is evaluated for this interaction. In the following examples, the basis function is given by Delaunay triangles and is defined to be linearly interpolating. It is to be understood that other types of basis functions may be used e.g. to achieve other interpolations, such as nearest neighbor interpolation, second order interpolation or higher, continuously differentiable interpolation, etc.

Figure 18A:
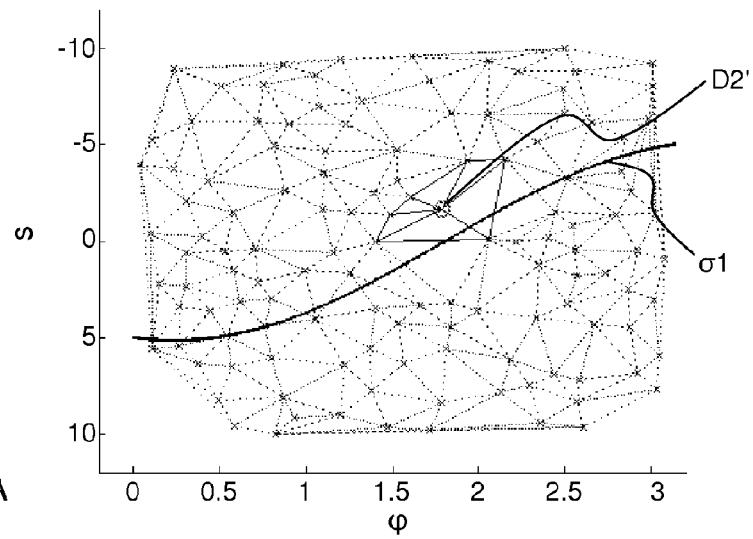
FIGS. 18A-18D illustrate the evaluation of a surface integral defined by a reconstruction line, a filter function and a basis function.

FIG. 18A illustrates the interaction between a reconstruction line $\sigma_1$ and the basis function for detection line (sampling point) $D_2'$.

Figure 18B:
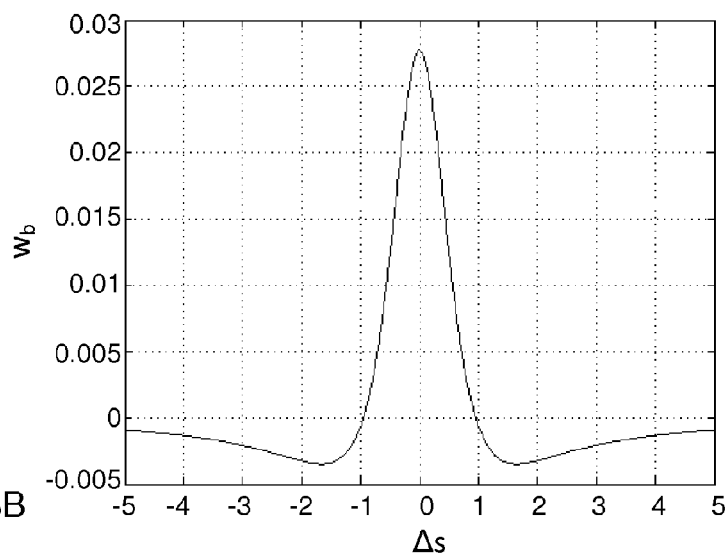

FIG. 18B illustrates a known one-dimensional filter $w_b(\Delta s)$ for use in the filtering step prior to a back projection operation. It can be noted, however, that the 1D filter is defined in terms of distance $\Delta s$ from the reconstruction line with respect to the s dimension. The 1D filter may be defined as a continuous function of distance $\Delta s$.

Figure 18C:
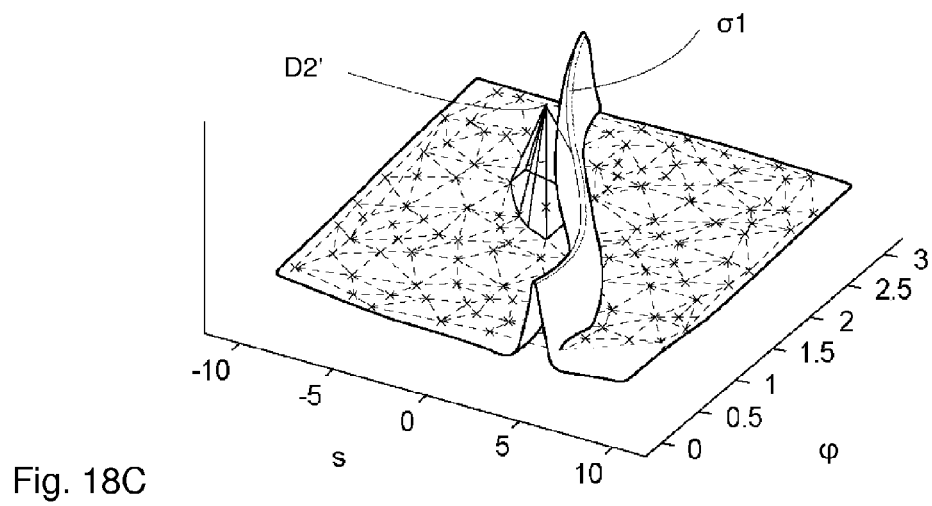

FIG. 18C illustrates the sample space with the basis function for sampling point $D_2'$ together with the reconstruction line $\sigma_1$ of FIG. 18A, where the reconstruction line is associated with a ridge. The ridge includes the 1D filter of FIG. 18B which has been reproduced to extend in the s dimension at plural locations along the reconstruction line $\sigma_1$. Thus, the ridge is defined as a 2D function $w_i(q), s)$ which is computed as $w_i(\phi, s) = w_b(x_i \cdot \theta - s)$, where $\theta = (\cos \phi, \sin \phi)$ and $x_i = (x_i, y_i)$. It should be noted that the 2D function $w_i(\phi, s)$ also defines negative valleys on both sides of the ridge.

Figure 18D:
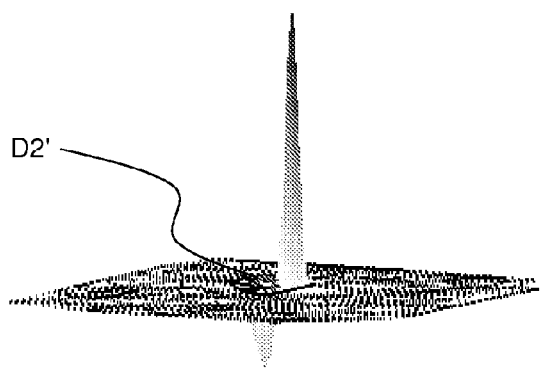

In the back projection operation, the values of the sampling points should be weighted with the effect of the 1D filter. FIG. 18D illustrates how the 2D function, which includes the 1D filter, combines with the basis function for sampling point $D_2'$, i.e. product of the 2D function and the basis function: $w_i(\phi, s) \cdot b_k^{D1}$. As can be seen from FIG. 18D, some parts of the sampling point $D_2'$, via the basis function, will contribute positively and some parts negatively. The total adjustment factor for the contribution of the sampling point $D_2'$ to the reconstruction line $\sigma_1$ in the back projection operation is given by the integral (sum) of the above result in FIG. 18D, which for $D_2'$ (i.e. for this particular sampling point and reconstruction line) turns out to be zero.

In this example, the adjustment factor is denoted $\rho_{k,i}^{wD1}$ and is computed according to:

$$\rho_{k,i}^{wD1} = \int w_i(\phi,s) \cdot b_k^{D1} d\phi ds.$$

Conceptually, this equation can be understood to reflect the notion that each detection line (sampling point) is not limited only to the sampling point but has an extended influence in the sample space via the extent of the basis function. A single detection line will thus contribute to the values of the $\phi$-s-plane in a region around the actual detection line in the sample space, the contribution being zero far away and having support, i.e. being greater than zero, only in a local neighborhood of the detection line. Higher density of detection lines (sampling points) in the sample space yields smaller support and lower density gives larger support. When a single adjustment factor $\rho_{k,i}^{wD1}$ is to be computed, all but the k:th detection line can be set to zero, before the above integral (sum) is computed. The integration (summation) is done in both dimensions $\phi$, s. Clearly, the adjustment factors account for variations in the local density of detection lines.

As noted above, the adjustment factor for detection line $D_2'$ is $\rho_{k,i}^{wD1} = 0$. This value of the adjustment factor accounts not only for the interaction between the reconstruction line and the sampling point, but also the influence of the 1D filter. This could be compared to the adjustment factor $\rho_{k,i}^{DA}$, which was computed to 0.32 for detection line $D_2'$ in Section 6.4 above. After adding the influence of the 1D filter ($\Delta s=1.5$ for detection line $D_2'$ and $w_b(\Delta s)=-1.5$), this equals $-1.5 * 0.32 = -0.0034$. Thus, the use of a surface integral results in a different adjustment factor, which may be more suitable for certain implementations of the touch system. However, the choice of technique for calculating the adjustment factors is a tradeoff between computational complexity and precision of the reconstructed attenuation field, and any of the adjustment factors presented herein may find its use depending on the circumstances.

In an alternative embodiment, the basis functions are instead defined based on the Voronoi cells of the sampling points. In this example, the adjustment factor is denoted $\rho_{k,i}^{wV0}$ and is computed according to:

$$\rho_{k,i}^{wV0} = \int w_i(\phi,s) \cdot b_k^{V0} d\phi ds.$$

7. Tomographic Reconstruction Using Adjustment Factors

There are numerous available techniques for reconstructing an attenuation field based on a set of projection values. The following description will focus on three main techniques, and embodiments thereof, namely Back Projection, Fourier Transformation and Hough Transformation. Common to all embodiments is that existing reconstruction techniques are re-designed, by the use of the adjustment factors, to operate on data samples that have an irregular or non-uniform arrangement in the sample space. Thus, the reconstruction step (cf. 24 in FIG. 10A) involves evaluating a reconstruction function $F(\rho_k, g(\phi_k, s_k))$, where $\rho_k$ is the adjustment factor (function or constant) for each data sample and $g(\phi_k, s_k)$ is the value of each data sample. Typically, the data samples are given by the measured projection values for the detection lines of the touch-sensitive apparatus. However, it is conceivable that the data samples includes synthetic projection values which are generated from the projection values, e.g. by interpolation, to supplement or replace the measured projection values.

For each embodiment, the application of adjustment factors will be discussed, and reference will be made to the different variants of adjustment factors discussed in sections 6.1-6.5. Furthermore, the processing efficiency of the embodiments will be compared using Landau notation as a function of n, with n being the number of incoupling and outcoupling points on one side of the touch surface. In some embodiments, a reconstructed attenuation field containing $n^2$ reconstruction points will be presented. The reconstructed attenuation field is calculated based on projection values obtained for the reference image in FIG. 19. The reference image is thus formed by five touch objects 7 of different size and attenuation strength that are distributed on the touch surface 1. For reasons of clarity, FIG. 19 also shows the emitters 2 and sensors 3 in relation to the reference image. The distribution of sampling points in the $\phi$-s-plane for this system is given in FIG. 9.

7.1 Unfiltered Back Projection

As an alternative to filtered back projection, it is possible to do an unfiltered back projection and do the filtering afterwards. In this case, the filtering process involves applying a two-dimensional sharpening filter. If the two-dimensional sharpening filter is applied in the spatial domain, the time complexity of the unfiltered back projection is $O(n^4)$. If the filtering is done in the Fourier domain, the time complexity may be reduced.

The unfiltered back projection involves evaluating reconstruction lines in the sample space, using adjustment factors computed by means of interpolating basis functions, as described above in section 6.5. As mentioned in that section, use of interpolating basis functions results in a correction for the local density of sampling points.

In this embodiment, the reconstruction function $F(\rho_k, g(\phi_k, s_k))$ is given by a first sub-function that performs the back projection at desired reconstruction points in the attenuation field:

$$(\mathcal{R}^\# v)(x_i) = \sum_k \rho_k \cdot g(\varphi_k, s_k),$$

and a second sub-function that applies the 2D sharpening filter on the reconstructed attenuation field.

In this embodiment, the adjustment factor $\rho_k$ may be any adjustment factor calculated based on an interpolating basis function, such as $\rho_{k,i}^{D1}$ or $\rho_{k,i}^{V0}$.

It can also be noted that since several adjustment factors $\rho_{k,i}$ are zero, the sum needs only be computed for a relevant subset of the sampling points, namely over all k where $\rho_{k,i} > TH$, where TH is a threshold value, e.g. 0.

The time complexity of the back projection operator is $O(n^3)$, assuming that there are $O(n)$ non-zero adjustment factors for each reconstruction point.

7.2 Filtered Back Projection, First Embodiment

In a first embodiment of filtered back projection, a reconstruction line in the sample space (cf. FIG. 16) is evaluated by computing a contribution value of each sampling point to the reconstruction line and summing the contribution values. The contribution value for a sampling point is given by the product of its projection value, its adjustment factor and a filter value for the sampling point.

In this embodiment, the reconstruction function $F(\rho_k, g(\phi_k, s_k))$ is given by $$(\mathcal{R}^\# v)(x_i) = \sum_k \rho_k \cdot w_b(s_k - x_i \cdot \theta_k) \cdot g(\varphi_k, s_k).$$

Figure 20:
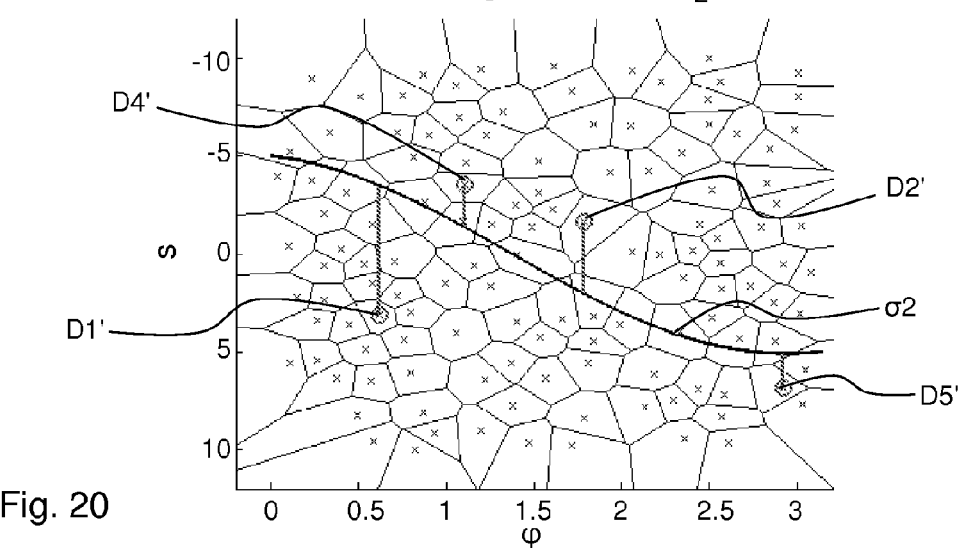
FIG. 20 illustrates a first embodiment of modified FBP reconstruction.

The time complexity of the reconstruction function is $O(n^4)$. In this function, $g(\phi_k, s_k)$ is the projection value of detection line k, $(\phi_k, s_k)$ is the position of the detection line k in the sample space, and $w_b(\Delta s)$ is the 1D filter given as a function of distance $\Delta s$ to the reconstruction line in the s dimension. The distance is computed as $\Delta s = s_k - x_i \cdot \theta_k$ where $x_i$ is the reconstruction point (in the attenuation field) and $\theta_k = (\cos \phi_k, \sin \phi_k)$. The operation of the reconstruction function is illustrated in FIG. 20 for four sampling points $D_1', D_2', D_4', D_5'$ in the $\phi$-s-plane. In this particular example, FIG. 20 also indicates the extent of Voronoi cells for all sampling points. The distance $\Delta s$ for each sampling point is computed as the distance in the vertical direction from the sampling point to the reconstruction line $\sigma_2$.

In this embodiment, the adjustment factor $\rho_k$ may be any adjustment factor that directly reflects the separation of sampling points in the sample space, such as $\rho_k^{VA}, \rho_k^{\lambda}, \rho_k^{N}$, and $\rho_k^{DA}$.

Figure 21A:
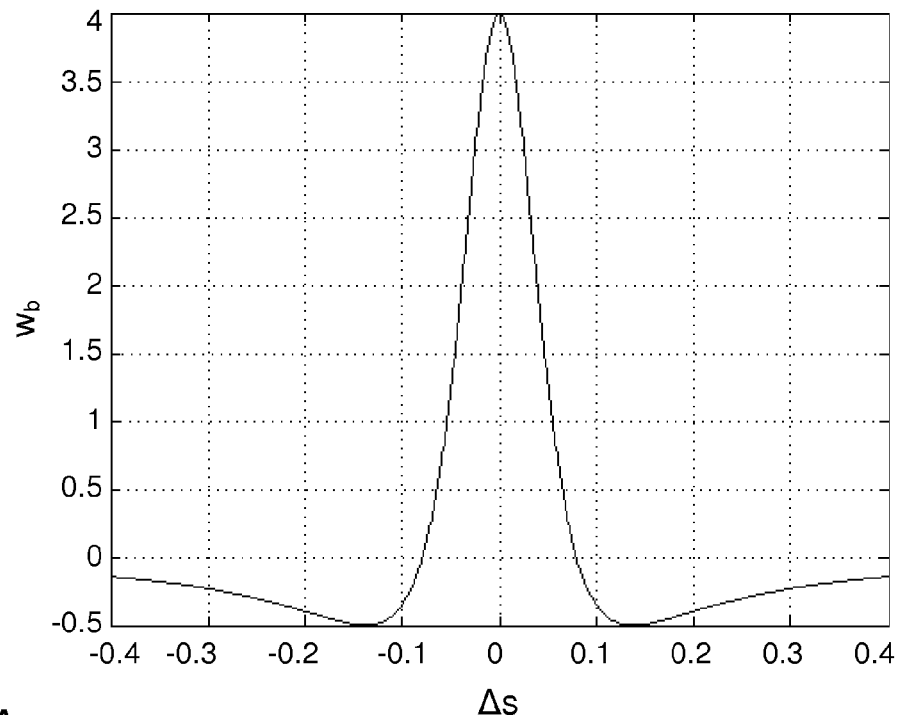
FIGS. 21A-21B are graphs of different filters for use in modified FBP reconstructions.
Figure 21B:
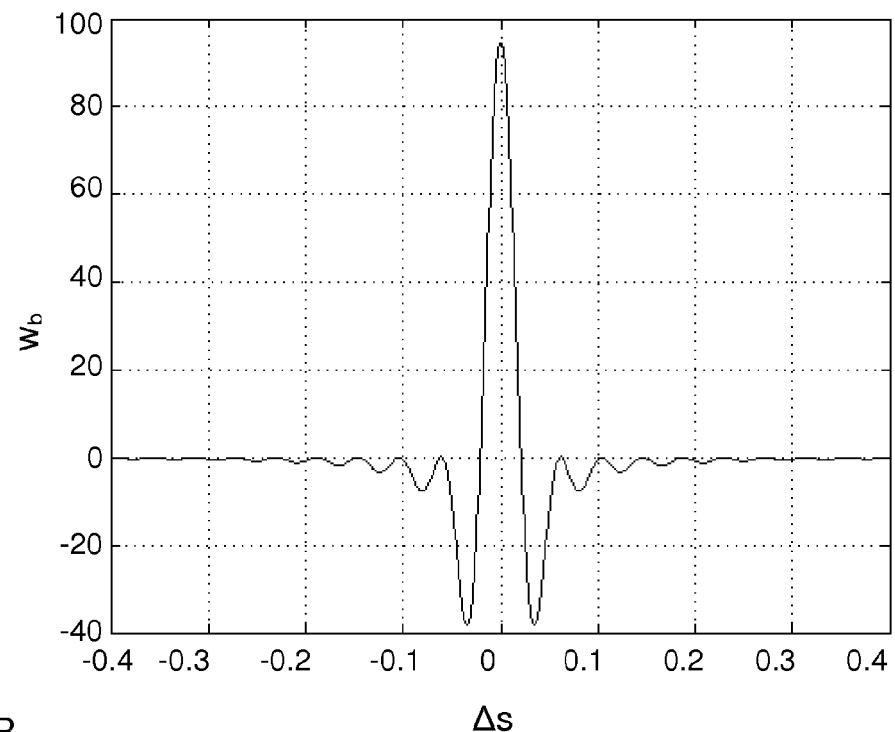

There are many different 1D filters $w_b(\Delta s)$ that may be used. The 1D filter may be defined as a continuous function of distance $\Delta s$. FIGS. 21A and 21B illustrate 1D filters presented in the aforesaid books by Kak & Slaney and Natterer, respectively. The bandwidth of these filters is preferably adapted to the signal bandwidth when the reconstruction function is evaluated.

Figure 19:
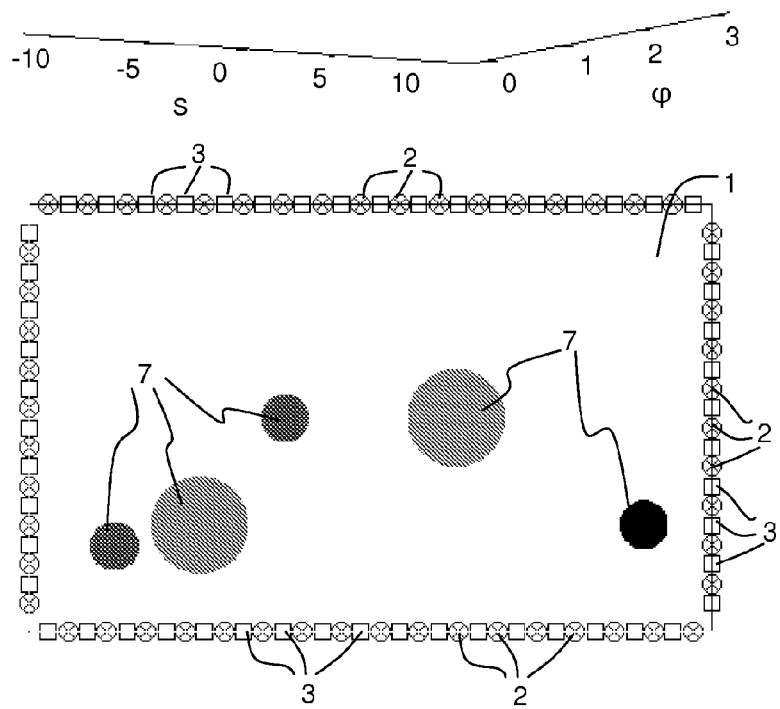
FIG. 19 is a reference image mapped to an interleaved arrangement.
Figures 22A, 22B:
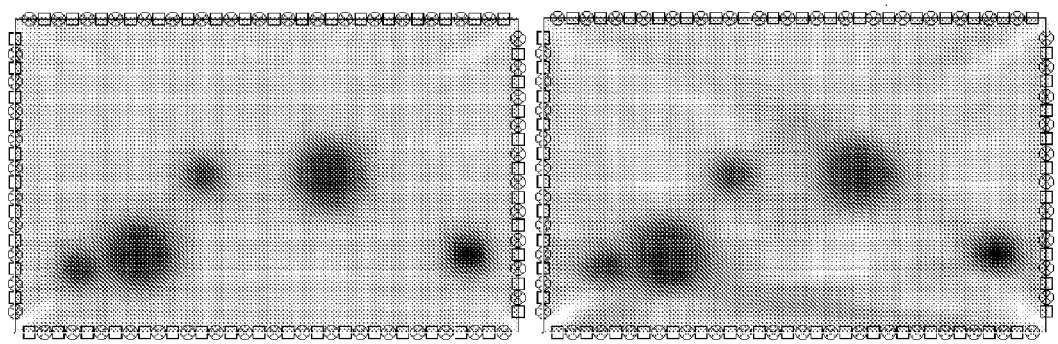
FIGS. 22A-22B show the reconstructed attenuation fields obtained by the first embodiment, with and without adjustment factors.

FIG. 22A illustrates the reconstructed attenuation field that is obtained by applying the reconstruction function, using $\rho_k^{VA}$, to the projection values obtained for the attenuation field in FIG. 19, and FIG. 22B illustrates a corresponding attenuation field obtained if the adjustment factors are omitted from the reconstruction function. Clearly, the adjustment factors greatly improve the quality of the reconstruction.

7.3 Filtered Back Projection, Second Embodiment

In a second embodiment of filtered back projection, a reconstruction line in the sample space is evaluated by extending the influence of the sampling points by the use of interpolating basis function and by including the 1D filter in the reconstruction line.

In this embodiment, the reconstruction function $F(\rho_k, g(\phi_k, s_k))$ is given by $$(\mathcal{R}^\# v)(x_i) = \sum_k \rho_k \cdot g(\varphi_k, s_k)$$

In this embodiment, the adjustment factor $\rho_k$ may be any adjustment factor originating from a surface integral through interpolating basis functions in the sample space, such as $\rho_{k,i}^{wD1}$ or $\rho_{k,i}^{wV0}$.

The time complexity of the reconstruction function is $O(n^4)$. It can be noted that the time for executing the reconstruction (cf. step 24 in FIG. 10A) is largely independent of the selected interpolating basis function and 1D filter, given that adjustment factors are typically pre-computed and stored in memory. The time spent for this pre-computation may however be different for different basis functions.

Figure 23A:
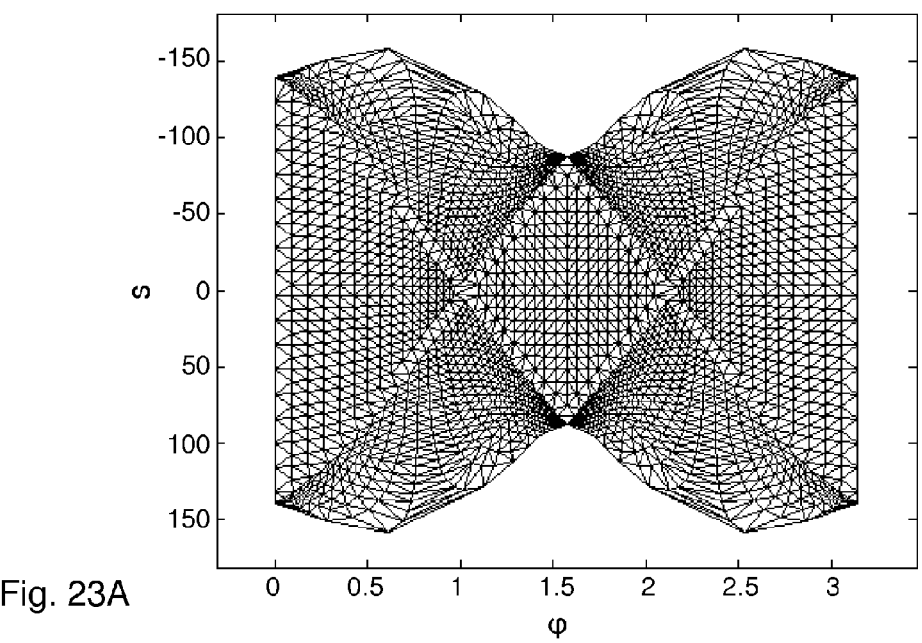
FIG. 23A is a graph of Delaunay triangles defined in the sample space of FIG. 9.
Figure 23B:
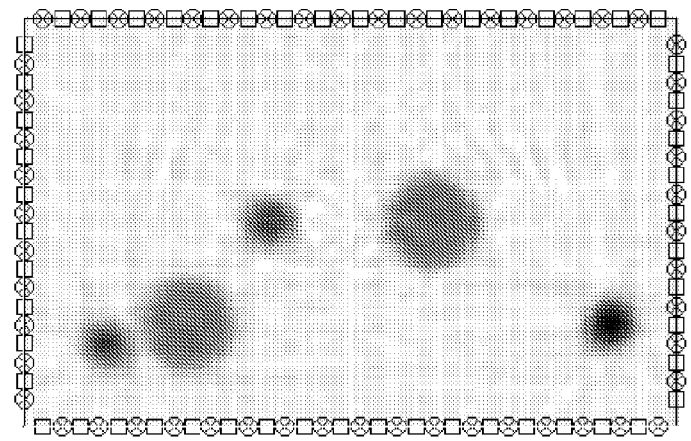
FIG. 23B shows the reconstructed attenuation field obtained by a second embodiment of modified FBP reconstruction.

FIG. 23A illustrates an exemplifying definition of Delaunay triangles for the sample space in FIG. 9. Based on this definition and the 1D filter in FIG. 21B, adjustment factors $\rho_{k,i}^{wD1}$ have been computed and applied in the reconstruction function. FIG. 23B illustrates the resulting attenuation field when the reconstruction function is operated on the projection values obtained for the attenuation field in FIG. 19. Clearly, the adjustment factors provide good reconstruction quality.

7.4 Filtered Back Projection, Third Embodiment

Figure 24A:
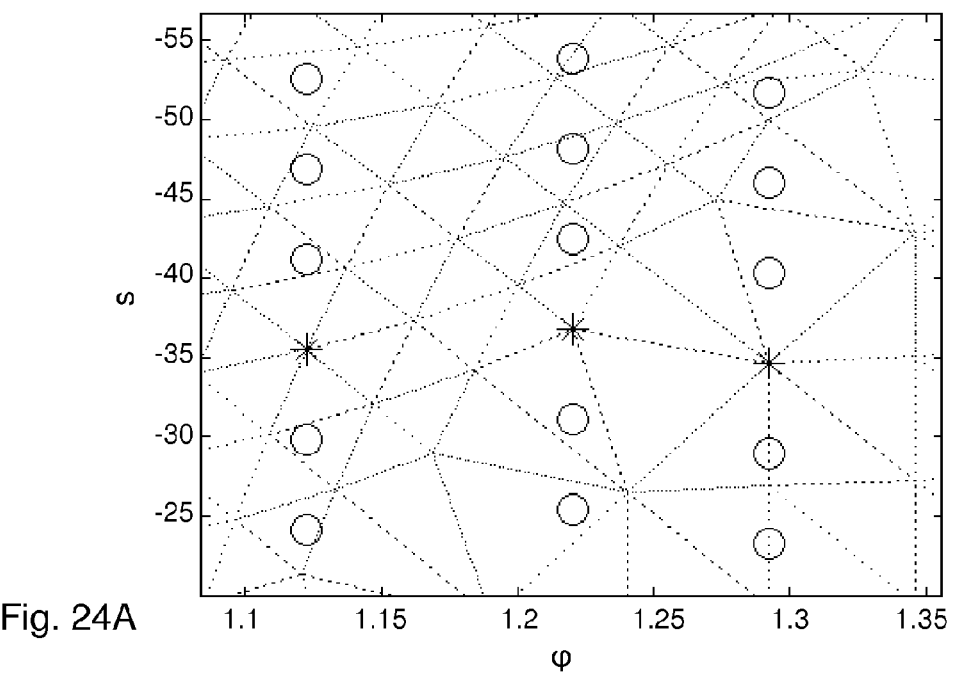
FIG. 24A illustrates a third embodiment of modified FBP reconstruction.

In a third embodiment of filtered back projection, the filtering step is performed locally around each individual sampling point in the sample space using the 1D filter. The filtering is operated on synthetic projection values at synthetic sampling points which are generated from the projection values of the sampling points, e.g. by interpolation. The synthetic projection values are estimated signal values that are generated around each projection value at given locations in the s dimension. FIG. 24A illustrates a few actual sampling points (stars) and associated synthetic sampling points (circles) in a subset of the $\phi$-s-plane of FIG. 9. FIG. 24A also illustrates Delaunay triangles (dotted lines) that may be used for interpolation of the synthetic sampling points. The actual sampling points are thus placed at the corners of a mesh of non-overlapping triangles, and the values of the synthetic sampling points are e.g. linearly interpolated in the triangles. This interpolation, and variants thereof, will be described in further detail below.

Furthermore, the third embodiment evaluates a reconstruction line in the sample space by computing a line integral through interpolating basis functions arranged at the actual sampling points.

In this embodiment, the reconstruction function $F(\phi_k, g(\phi_k, s_k))$ is given by a first sub-function that creates 2M synthetic sampling points $g(\phi_{k,m}, s_{k,m})$ with respect to the s dimension, and a second sub-function that applies a discrete 1D filter (in the s dimension) on the collection of sampling points (actual and synthetic) to calculate a filtered value for each actual sampling point:

$$v(\varphi_k, s_k) = \sum_{m=-M}^{M} w_b(s_k - s_{k,m}) \cdot g(\varphi_{k,m}, s_{k,m}),$$

and a third sub-function that performs the back projection at desired reconstruction points in the attenuation field, based on the filtered values:

$$(\mathcal{R}^\# v)(x_i) = \sum_k \rho_k \cdot v(\varphi_k, s_k).$$

In the above expressions $g(\phi_{k,0}, s_{k,0}) \equiv g(\phi_k, s_k)$, i.e. an actual sampling point. The adjustment factor $\rho_k$ may be any adjustment factor originating from a line integral through interpolating basis functions in the sample space, such as $\rho_{k,i}^{D1}$ or $\rho_{k,i}^{V0}$. It can also be noted that since several adjustment factors $\rho_{k,i}$ are zero, the sum needs only be computed for a relevant subset of the sampling points, namely over all k where $\rho_{k,i}>$TH, where TH is a threshold value, e.g. 0.

Any suitable 1D filter may be used, e.g. the one shown in FIG. 7D. However, it may be advantageous to adapt the bandwidth of the filter to each actual sampling point.

Figure 24B:
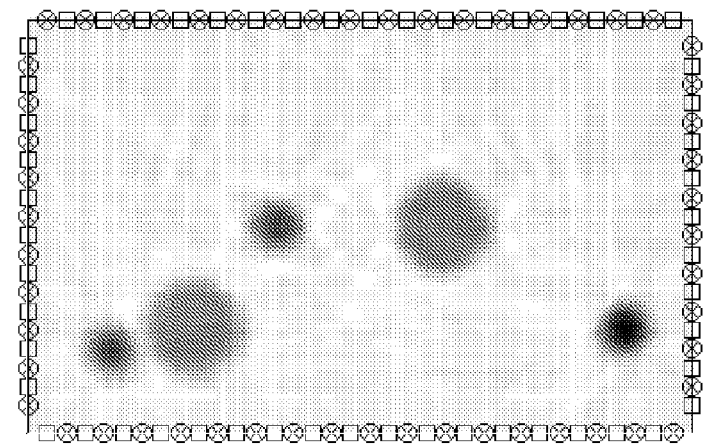
FIG. 24B shows the reconstructed attenuation field obtained by the third embodiment.

FIG. 24B illustrates the resulting attenuation field when the reconstruction function is operated on the projection values obtained for the attenuation field in FIG. 19, using adjustment factors $\rho_{k,i}^{D1}$ and the 1D filter in FIG. 21B. Clearly, the adjustment factors provide good reconstruction quality.

The time complexity of the reconstruction function is $O(n^3)$. This is based on the fact that the number of sampling points are $O(n^2)$, that the first sub-function computes $O(M \cdot n^2)$ synthetic projection values, with M being $O(n)$, that the second sub-function accesses each synthetic sampling point once, and that the third sub-function accesses $O(n)$ filtered values to generate each of $O(n^2)$ reconstruction points, giving a total time complexity of $O(n^3)$.

As noted above, the generation of synthetic projection values may be achieved by interpolating the original sampling points. The objective of the interpolation is to find an interpolation function that can produce interpolated values at specific synthetic sampling points in the sample space given a set of measured projection values at the actual sampling points. Many different interpolating functions can be used for this purpose, i.e. to interpolate data points on a two-dimensional grid. Input to such an interpolation function is the actual sampling points in the sample space as well as the measured projection value for each actual sampling point. Most interpolating functions involve a linear operation on the measured projection values. The coefficients in the linear operation are given by the known locations of the actual sampling points and the synthetic sampling point in the sample space. The linear operator may be pre-computed and then applied on the measured projection values in each sensing instance (cf. iteration of steps 22-26 in FIG. 10A). Some non-limiting examples of suitable interpolation functions include Delaunay triangulation, and other types of interpolation using triangle grids, bicubic interpolation, e.g. using spline curves or Bezier surfaces, Sinc/Lanczos filtering, nearest-neighbor interpolation, and weighted average interpolation. Embodiments of these and other techniques for generating synthetic sampling points (interpolation points) are further disclosed in Applicant's International application No. PCT/SE2011/050520, which was filed on Apr. 28, 2011 and which is incorporated herein by this reference.

7.5 Filtered Back Projection, Fourth Embodiment

In a fourth embodiment of filtered back projection, the filtering step is performed locally around each individual sampling point in the sample space using a 1D filter. In contrast to the third embodiment, the filtering is not operated on synthetic projection values, but on the projection values of adjacent actual sampling points that are forced into the 1D filter. The projection values of adjacent sampling points thus form estimated signal values around each projection value in the s dimension. In the following example, the 1D filter is a $(-1, 2, -1)$ kernel which is operated with respect to the dimension.

Furthermore, the fourth embodiment evaluates a reconstruction line in the sample space by computing a line integral through interpolating basis functions arranged at the actual sampling points.

Figure 25C:
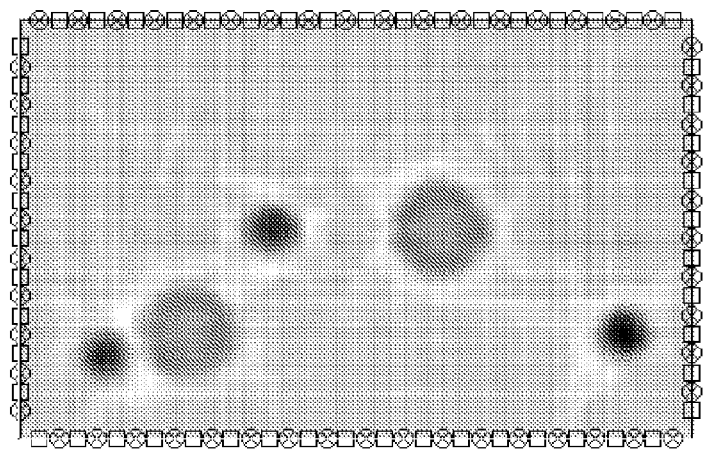
FIG. 25C shows the reconstructed attenuation field obtained by the fourth embodiment.
Figure 25A:
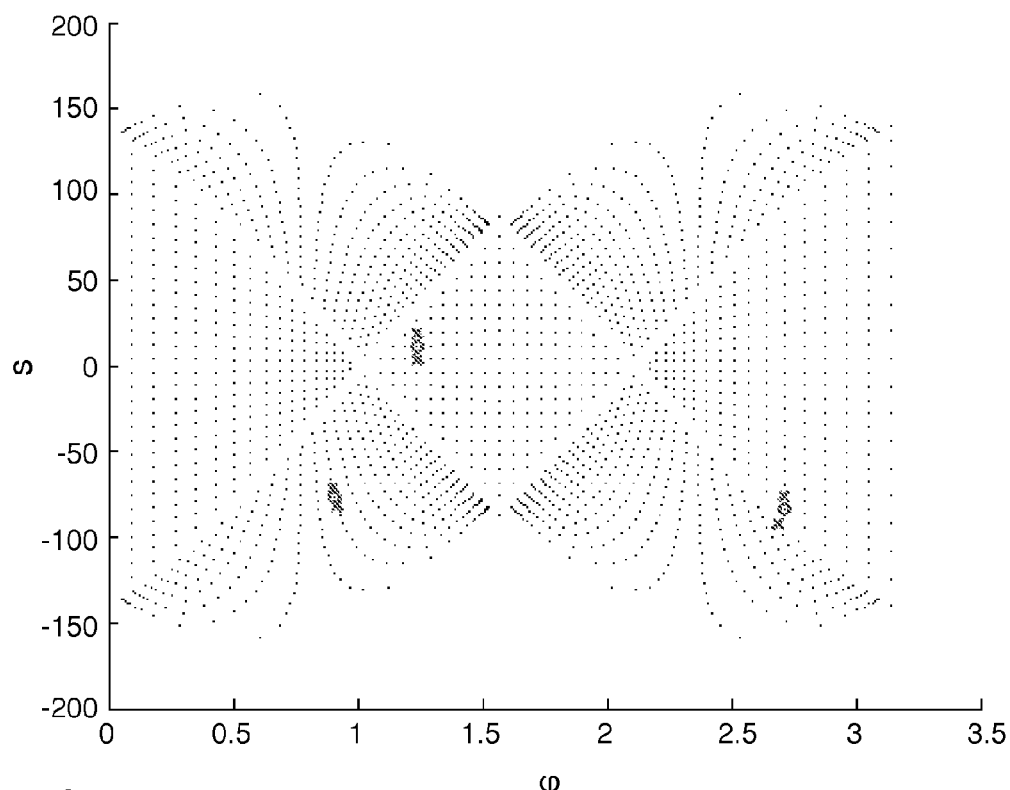
FIG. 25A-25B illustrate a fourth embodiment of modified FBP reconstruction.

FIG. 25A illustrates all sampling points in the $\phi$-s-plane for the touch-sensitive apparatus in FIG. 2. For the purpose of illustrating the use of neighboring sampling points, selected sampling points are indicated by circles, and their adjacent sampling points in the s dimension are indicated by crosses. The filtered value for each selected sampling points is calculated, using the above filter kernel, as two times the projection value of the selected sampling point minus the projection values of the adjacent sampling points.

The adjacent sampling points are generally selected as a best match to the extent of the filter kernel in the s dimension of the sample space.

Figure 25B:
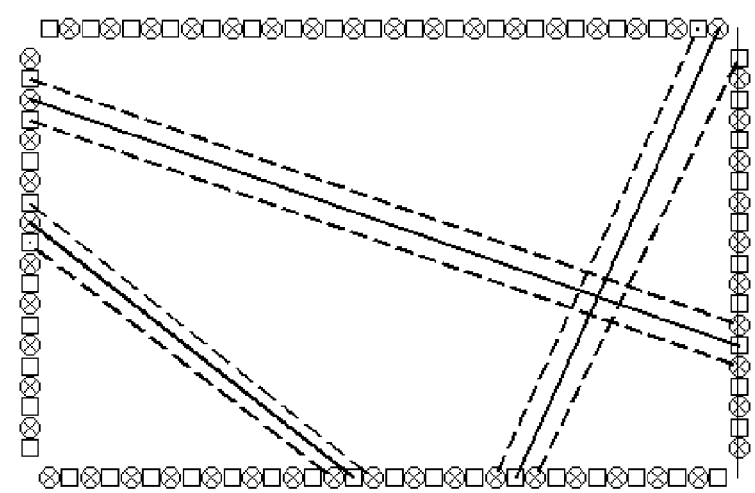

For the interleaved arrangement (FIG. 2), the adjacent sampling points for each sampling point may instead be selected based on geometric criteria. In the interleaved arrangement, the adjacent sampling points are detection lines that extend from the next incoupling point (emitter) and the next outcoupling point (detector) in both directions away from the incoupling and outcoupling points that defines the detection line of the selected sampling point. This principle is illustrated in FIG. 25B, where the detection lines of the selected sampling points in FIG. 25A are represented by solid lines, and the detection lines of the adjacent sampling points are represented by dashed lines. Thus, a filtered value for a detection line (sampling point) may be computed by identifying the incoupling and outcoupling points that give rise to the detection line, and then finding the neighboring incoupling and outcoupling points.

In this embodiment, the reconstruction function $F(\rho_k, g(\phi_k, s_k))$ is given by a first sub-function that finds the adjacent sampling points, $g(\phi_{k'}, s_{k'})$ and $g(\phi_{k''}, s_{k''})$, a second-sub-function that applies the filter kernel on the relevant sampling points:

$$v(\phi_k, s_k) = -g(\phi_{k'}, s_{k'}) + 2 \cdot g(\phi_k, s_k) - g(\phi_{k''}, s_{k''}),$$

and a third sub-function that performs the back projection at desired reconstruction points in the attenuation field, based on the filtered values:

$$(\mathcal{R}^{\#}v)(x_i) = \sum_k \rho_k \cdot v(\varphi_k, s_k).$$

The adjustment factor $\rho_k$ may be any adjustment factor originating from a line integral through interpolating basis functions in the sample space, such as $\rho_{k,i}^{D1}$ or $\rho_{k,i}^{V0}$. It can also be noted that since several adjustment factors $\rho_{k,i}$ are zero, the sum needs only be computed for a relevant subset of the sampling points, namely over all k where $\rho_{k,i}$>TH, where TH is a threshold value, e.g. 0. It is also conceivable to add an overall scaling factor to the back projection operator to achieve a desired reconstruction result.

It should be realized that other filter kernels may be used, although it for practical reasons may be preferable to limit the kernel to 3-15 values.

FIG. 25C illustrates the resulting attenuation field when the reconstruction function is operated on the projection values obtained for the attenuation field in FIG. 19, using adjustment factors $\rho_{k,i}^{D1}$ and the above-described filter kernel. Clearly, the adjustment factors provide adequate reconstruction quality.

7.6 Fourier Transformation Techniques

It is also possible to use so-called NUFFT algorithms in the reconstruction step (24 in FIG. 10A). A NUFFT (Non-Uniform FFT) algorithm is an adaptation of a regular discrete Fourier transformation function, e.g. an FFT, to handle non-uniform input data and/or output data while retaining the "fast" property of the FFT algorithms, thus allowing for time complexities of $O(n^2 \cdot \log(n))$. Specifically, the reconstruction step may utilize a so-called NED (Non-Equispaced Data) algorithm which is modified by adjustment factors to account for the varying density of sampling points in the sample space.

To simplify the following presentation, the theory of NED algorithms in general and the inventive modification in particular has been separated into Chapter 8.

In one embodiment, the reconstruction function $F(\rho_k, g(\phi_k, s_k))$ is given by four consecutive sub-functions. A first sub-function operates a 2D forward NED FFT on the projection values to generate the Fourier transform of $g(\phi_k, s_k)$:

$$\hat{g}(\psi, r) \overset{F_2}{\leftarrow} \rho_k \cdot g(\varphi_k, s_k).$$

Thereby, the Fourier transform is computed with respect to both dimensions $\phi$, s. The forward NED FFT applies adjustment factors to compensate for varying density of sampling points in the sample space. The evaluation of the first sub-function typically operates on pre-computed adjustment factors and other pre-computed coefficients of the forward NED FFT (see Chapter 8).

A second sub-function operates a regular 1D inverse Fourier transform (e.g. an FFT) with respect to the $\phi$ dimension:

$$\hat{g}(j, r) \overset{F_1^{-1}}{\leftarrow} \tilde{g}(\psi, r).$$

This is done since the Projection-Slice Theorem is valid only for Fourier transforms with respect to the s dimension, i.e. one-dimensional transforms of the different projections. The second sub-function results in a polar coordinate representation, possibly oversampled, of the Fourier transform of the attenuation field to be reconstructed.

A third sub-function, which is optional, applies a smoothing filter $F(r/Q)$ to $\hat{g}(j,r)$ and may also apply a scaling factor $\rho_r$ to scale the result to an appropriate level:

$$\hat{f}(j,r) = F(r/Q) \cdot \rho_r \cdot \hat{g}(j,r).$$

A fourth sub-function operates a 2D inverse NED FFT on the polar representation $\hat{f}(j,r)$ to generate the attenuation field:

$$\tilde{f}(x, y) \overset{F_2^{-1}}{\leftarrow} \hat{f}(j, r).$$

The inverse NED FFT may or may not be designed in correspondence with the forward NED FFT.

The time complexity of the reconstruction function is $O(n^2 \cdot \log(n))$.

In this embodiment, the adjustment factor $\rho_k$ may be any one of a, $\rho_k^\lambda$, $\rho_k^N$, $\rho_k^{VA}$, $\rho_k^{DA}$, $\rho_{k,m}^{\phi D1}$, or $\rho_{k,m}^{\phi V0}$. The last two adjustment factors are obtained similarly to the adjustment factors $\rho_{k,i}^{wD1}$ and $\rho_{k,i}^{wV0}$ respectively, i.e. via surface integrals through interpolating basis functions (section 6.5). However, instead of reproducing a 1D filter, $w_b$, along the reconstruction line, the interpolating function $\hat{\phi}$ is reproduced along the reconstruction line. The interpolating function $\hat{\phi}$ is defined in Chapter 8.

7.7 Hough Transformation Techniques

The Hough transform is a method for extracting features. It is mainly used in image analysis and computer vision. The main idea is to find geometric objects within a certain class of geometric shapes by a voting procedure. The voting procedure is carried out in the parameter space of the representation of the geometric objects. Generally, the objects are found as local maxima in a so-called accumulator space.

The original algorithm is a method for finding lines in a digital image. The original algorithm is outlined below, followed by ways to modify and use the Hough transformation for finding touches in the sinogram directly, without filtering and back projection.

As noted in Chapter 4 above, any line in a two-dimensional (image) plane can be represented by an angle, $\gamma$, and the smallest distance to the origin, r. This means that any given line can be defined as a point in the $\gamma$-r-plane. The inverse is also true; any point (pixel) in the image plane can be represented by a curve in the $\gamma$-r-plane. This curve represents all the different lines that the point can be a part of. This is the fundament of the Hough transform. For each point in the image plane, the value (weight) of the point is added to the corresponding line in the $\gamma$-r-plane (in an accumulator image). When all points in the image plane have been processed, the lines present in the image can be found as local maxima in the accumulator image. The position of a local maximum identifies the values of the two parameters $\gamma$, r for the line. The presence of several local maxima would indicate that there are several different lines in the image.

The line detection algorithm cannot be directly applied for reconstructing the attenuation field based on the measured projection values. However, a modification of the Hough transform can be used for finding sine curves (i.e. reconstruction lines) present in the sinogram. It can be noted that all sine curves have the same periodicity, $2\pi$, and that a sine curve can be represented by an amplitude, A, and a phase, $\phi$. Hence, for all sampling points in the sinogram, the weight of the sampling point is added to all corresponding sine curves in the accumulator image. The weight of the sampling point is given by the projection value modified by the adjustment factor $\rho_k$, such that the projection value is compensated for the local density of sample points. In this embodiment, the adjustment factor $\rho_k$ may be any adjustment factor that directly reflects the separation of sampling points in the sample space, such as $\rho_k^{VA}$, $\rho_k^{\lambda}$, $\rho_k^{N}$, and $\rho_k^{DA}$. When all sampling points have been processed, touches are found as local maxima in the accumulator image.

The modified Hough transform algorithm has a time complexity of $O(n^3)$, since $O(n^1)$ values are added to the accumulator image for each detection line, the number of detection lines being $O(n^2)$. The process for finding local maxima has a lower time complexity.

8. NUFFT Theory and Modification of NED FFT

NUFFT algorithms come in many different names: Non-Uniform FFT (NUFFT/NFFT), Generalized FFT (GFFT), Non-uniform DFT (NDFT), Non-Equispaced Result FFT (NER), Non-Equispaced Data FFT (NED), Unequally spaced FFT (USFFT). There are many different variants of NUFFT algorithms; some use least-squares, some use iterative solutions and some use Fourier expansion (Shannon's sampling theorem) to re-map the non-uniform data points to an equispaced grid, which is amenable to fast algorithms. Below, the underlying theory will be presented based on the sampling theorem. Further details are found in the article "Non-Equispaced Fast Fourier Transforms with Applications to Tomography", by Karsten Fourmont, in Journal of Fourier Analysis and Applications. Volume 9, Issue 5, 2003, pages 431-450.

The Fourier transform of non-equispaced data, $z_k = z(x_k)$, where $x_k \in [-N/2, N/2]$, can be evaluated at equispaced grid points $l=-N/2, \ldots, (N/2)-1$. The equation is a forward NED (Non-Equispaced Data) function that can be written as:

$$\hat{z}_l = \sum_{k=1}^{K} e^{-2\pi i \cdot x_k \cdot l/N} \cdot z_k$$

The goal is now to express every single part of the summation above as a sum, i.e.

$$e^{-2\pi i \cdot x_k \cdot \frac{l}{N}} = \sum_m \tau(x_k, m) \cdot e^{-2\pi i \cdot m \cdot \frac{l}{N}}$$

using a suitable weight function $\tau(x_k, m)$.

As will be shown, this equation can be adapted to use standard FFT algorithm implementations. Consider Shannon's theorem for a band limited function $f$ with bandwidth $<\pi$:

$$f(x) = \sum_{m \in \mathbb{Z}} \mathrm{sinc}(\pi(x-m)) \cdot f(m)$$

If $f$ is chosen to represent a single function in a Fourier expansion, the above equation becomes:

$$e^{-i \cdot x \cdot \omega} = \sum_{m \in \mathbb{Z}} \mathrm{sinc}(\pi(x-m)) \cdot e^{-i \cdot m \omega}, |\omega| < \pi$$

The exponential on the right-hand side resembles a component of an FFT function. However, the sinc function may not decay fast enough to allow for rapid computation. To achieve rapid computation, we may give up the requirement of finding a band-limited function, and instead use an essentially band-limited function. In this way, a function may be found that has a rapid decay while also providing a rapid decay in its Fourier transform. For example, the following interpolating function may be used:

$$e^{-i x \omega} = \frac{1}{\sqrt{2\pi} \cdot \phi(\omega)} \sum_{m \in \mathbb{Z}} \hat{\phi}(x-m) e^{-i x m}$$

To get better resolution in the frequency domain, oversampling may be introduced, given by a factor c. The oversampling factor can be as low as 3/2, but for the examples herein c=2. We also require that $\phi(\omega)$ has compact support and is continuously differentiable in $[-\alpha, \alpha]$ and is non-zero in $[-\pi/c, \pi/c]$. The Fourier transform of $\phi(\omega)$ is preferably as small as possible outside of $[-M, M]$ since this will make the summation fast and exact.

The best solution for $\phi(\omega)$ is the prolate spheroidal wave functions. These functions are, however, difficult to use and instead Kaiser-Bessel window functions may be used as approximate solution:

$$\hat{\phi}(x) = \frac{1}{\sqrt{2\pi}} \frac{\sinh(\alpha\sqrt{M^2 - x^2})}{\sqrt{M^2 - x^2}}, x^2 < M^2$$

$$\phi(\omega) = \begin{cases} I_0(M\sqrt{\alpha^2 - x^2}), & |x| \leq \alpha \\ 0, & |x| > \alpha \end{cases}$$

The first function, $\hat{\phi}(x)$, is taken to be zero when $x^2 \geq M^2 \cdot I_0$ is the modified Bessel function of the first kind. By choosing $\omega = 2\pi \cdot l/(c \cdot N)$ and $x = c \cdot x_k$, we get efficient equations for the NED algorithm.

It should be noted that inverse NED algorithms perform all steps equal to the forward NED algorithm but uses an ordinary IFFT instead.

8.1 1D NED Algorithm, Modified with Adjustment Factors

Below, we give a practical implementation for a NED algorithm for one-dimensional transforms. The NED equation is given by:

$$\hat{z}_l = \sum_{k=1}^{K} \left( \frac{1}{\sqrt{2\pi} \cdot \phi(2\pi \cdot l/(c \cdot N))} \sum_{m \in \mathbb{Z}} \hat{\phi}(c \cdot x_k - m) e^{-2\pi i \cdot m \cdot l/(c \cdot N)} \right) \cdot \rho_k \cdot z_k$$

for $l = -N/2, \ldots, N/2-1$. The NED equation includes an adjustment factor $\rho_k$, which compensates for the varying density of sampling points. The adjustment factor will be discussed in more detail below.

The above NED equation may be modified to utilize regular FFT implementations. If it is assumed that $\hat{\phi}$, $\phi$, and $z_k$ are zero outside their area of definition, it is now possible to convert the NED equation to:

$$\hat{z}_l = \frac{1}{\phi_l} \sum_{k=1}^{K} \sum_{m=-M}^{M} \hat{\phi}_{k,m} e^{-2\pi i \cdot (\mu_k + m) \cdot \frac{l}{(c \cdot N)}} \cdot \rho_k \cdot z_k$$

where we have introduced the following notations:

$$\phi_l = \sqrt{2\pi} \cdot \phi(2\pi \cdot l/(c \cdot N)), \text{ for } l = -N/2, \ldots, N/2-1$$

$$\mu_k = \mathrm{round}(c \cdot x_k), \text{ for } k = 1, \ldots, K$$

$$\hat{\phi}_{k,m} = \frac{1}{\sqrt{2\pi}} \cdot \rho_k \cdot \hat{\phi}(c \cdot x_k - (\mu_k + m)), \text{ for } k = 1, \ldots, K$$

and $m = -M, \ldots, M$

To make the algorithm as fast as possible, most of the coefficients above may be pre-computed.

The equation can be rewritten, by introducing a new index $q=\mu_k+m$:

$$\hat{z}_l = \frac{1}{\phi_l} \sum_{q=-cN/2}^{cN/2-1} u_q \cdot e^{-2\pi i \cdot q \cdot \frac{l}{(c \cdot N)}}$$

for $q=-cN/2, \ldots, cN/2-1$, and where $$u_q = \sum_k \sum_t \rho_k \cdot z_k \cdot \hat{\phi}_{k,q+ctN-\mu_k}$$

Non-zero terms of $u_q$ occur only for $|q+ctN-\mu_k| \leq M$, which means that each $u_q$ is the sum of all non-equispaced $z_k$, multiplied with their respective adjustment factor, within distance $\leq M$; with distance computed modulo cN.

It should be clear from the above rewritten equation that an ordinary FFT may be used for solving the NED problem.

It should be noted that $\mu_k$ is the nearest equispaced sampling point in the FFT input. The input for the NED FFT comprises the projection values of the non-equispaced sampling points $z_k$, the sampling points $x_k$, the oversampling factor c, with a total length c·N suitable for FFT, the interpolation length M, and the coefficients $\phi_k$, $\mu_k$ and of $\hat{\phi}_{k,m}$ which may be pre-computed.

8.2 2D NED Algorithm, Modified with Adjustment Factors

The above 1D NED algorithm is easily extendable to more dimensions. In two dimensions, the NED problem may be formulated as $$\hat{z}_{l,n} = \sum_{k=1}^{K} e^{-2\pi i \cdot x_k \cdot l/N} \cdot e^{-2\pi i \cdot y_k \cdot n/N} \cdot \rho_k \cdot z_k,$$

for $l,n=-N/2, \ldots, N/2-1$

It should be noted that the $(x_k, y_k)$ values are not necessarily a tensor product of two coordinates and therefore cannot be written, in the general form, as two indices, i.e. one for each dimension. The weighing factor is, on the other hand, chosen as a tensor product, $\phi(x, y)=\phi(y)\cdot\phi(y)$. To make the 2D NED algorithm as fast as possible, most coefficients may be pre-computed:

$$\phi_{l,n} = \sqrt{2\pi} \cdot \phi(2\pi \cdot k/(c \cdot N)) \cdot \phi(2\pi \cdot n/(c \cdot N)),$$

for $l, n = -N/2, \ldots, N/2-1$ $\mu_k^x = \text{round}(c \cdot x_k)$, for $k = 1, \ldots, K$ $\mu_k^y = \text{round}(c \cdot y_k)$, for $k = 1, \ldots, K$ $$\hat{\phi}_{k,m^x,m^y} = \frac{1}{\sqrt{2\pi}} \cdot \rho_k \cdot \hat{\phi}(c \cdot x_k - (\mu_k^x + m^x)) \cdot \hat{\phi}(c \cdot y_k - (\mu_k^y + m^y)),$$

for $k = 1, \ldots, K$ and for $m^x, m^y = -M, \ldots, M$

The execution of the 2D NED algorithm thus comprises the steps:

1. Compute the $u_{q^x,q^y}$-values. Start by setting all $u_{q^x,q^y}=0$, then loop over $m^x=-M, \ldots, M$, $m^y=-M, \ldots, M$, and $k=1, \ldots, K$ and in this way build the $u_q$-values:

$$u_{\mu_k^x+m^x,\mu_k^y+m^y} = u_{\mu_k^x+m^x,\mu_k^y+m^y} + z_k \cdot \hat{\phi}_{km^xm^y}$$

2. Compute $$U_{k,n} \xleftarrow{F_2} u_{q^x,q^y},$$

using an ordinary FFT on input length c·N

3. Scale the result: $\hat{z}_{l,n}=U_{l,n}/\phi_{l,n}$

It should be noted that different M may be used for the two different directions, this is also true for c and N.

8.3 Adjustment Factors in NED Algorithms

The need for using adjustment factors in the NED algorithms above becomes apparent when the density of sampling points $x_k$ is very unevenly distributed. It can be noted that $u_q$ is defined as the sum of the neighboring $x_k$ (within distance M) multiplied by the $\hat{\phi}$ function. For the sake of argument, let $\hat{\phi}=1$. Then, the sum will depend on the number of sampling points that contribute to a particular $u_q$ value. Consider, for example, if the function $$z_k=1, \forall k$$

is sampled twice for $u_0$ and once for $u_1$. This would make the resulting $u_q$ values differ when they in fact should be identical. This serious artifact is overcome by scaling the $\hat{\phi}_{km}$ coefficients by the adjustment factor $\rho_k$. As explained in section 7.6, the adjustment factor $\rho_t$ may be any one of $\rho_k^\lambda$, $\rho_k^N$, $\rho_k^{VA}$ or $\rho_k^{DA}$. As also explained in section 7.6, the adjustment factor may be computed as the product of interpolation basis functions, for instance $b_k^{D1}$ or $b_k^{V0}$, for a given sampling point with the two-dimensional extent of the interpolating function $\hat{\phi}$. This would render a set of adjustment factors $\rho_{k,m}^{\hat{\phi}D1}$ and $\rho_{k,m}^{\hat{\phi}V0}$ respectively. These adjustment factors are also extendible into two dimensions as $\rho_{k,m^x,m^y}^{\hat{\phi}D1}$ and $\rho_{k,m^x,m^y}^{\hat{\phi}V0}$.

8.4 Notes on FFT Implementations

In this chapter, the Fourier transform is defined as:

$$\hat{z}_l = \sum_{k=-N/2}^{N/2-1} e^{-2\pi i \cdot l \cdot k/N} \cdot z_k$$

Many efficient implementations of the FFT algorithm are defined as:

$$\hat{z}_l = \sum_{k=0}^{N-1} e^{-2\pi i \cdot l \cdot k/N} \cdot z_k$$

It is possible to utilize existing FFT implementations by swapping the first and last parts of the data before and after the FFT. Another way is to modulate the input by the sequence 1, −1, 1, −1, . . . and then modulate the output by the same sequence. The sequence is actually the Nyquist frequency $e^{-\pi i \cdot k}$.

It is also possible to utilize special FFT implementations that only handle real input for the Fourier transform and real output for the inverse Fourier transform.

It is also possible that there is a need to take special care with the multiplication constants in the Fourier transforms of the particular FFT implementation, i.e. whether or not multiplication of $1/\sqrt{2\pi}$ is done symmetrically or is absent.

9. Concluding Remarks

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

Figure 26:
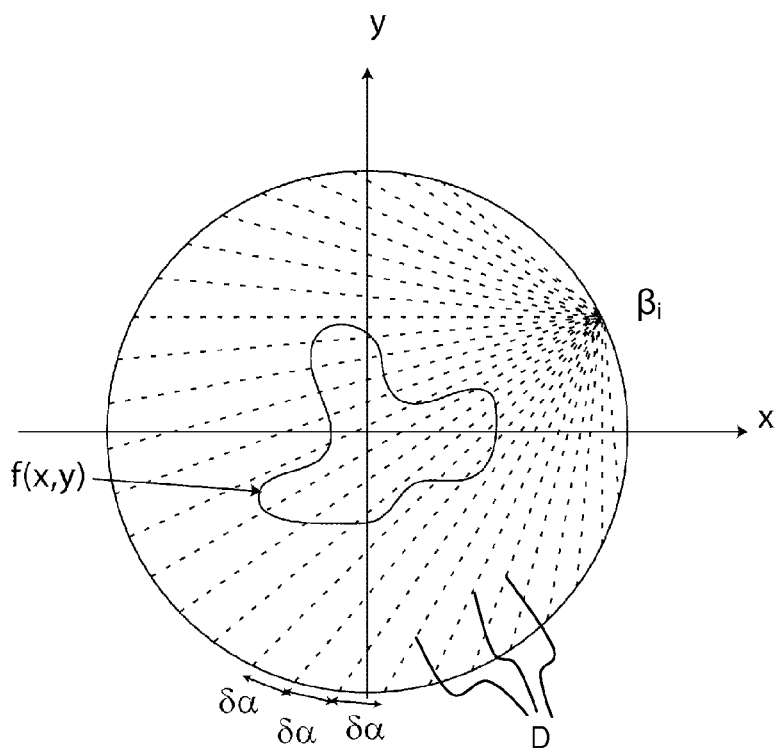
FIG. 26 illustrates a fan geometry used in tomographic reconstruction.
Figure 27:
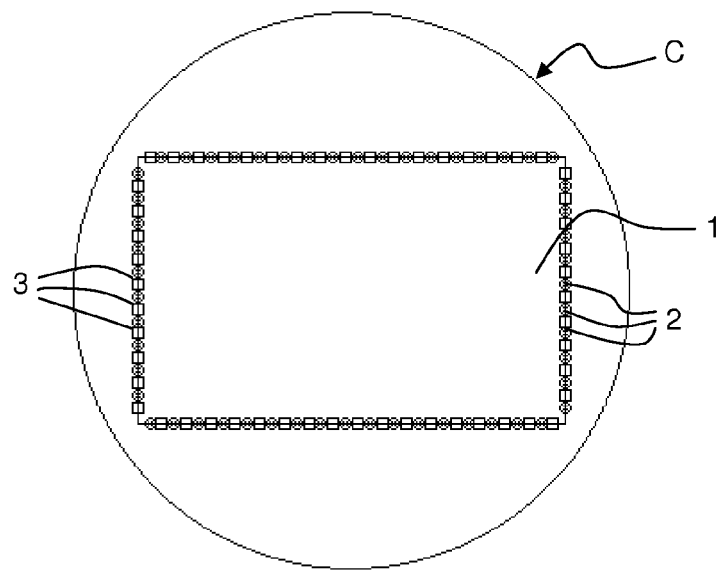
FIG. 27 illustrates the use of a circle for mapping detection lines to a sample space for fan geometry reconstruction.

For example, although the detection lines have been represented as sampling points in the φ-s-plane, it should be realized any other parameter representation of the detection lines can be used. For example, the detection lines can be represented in a β-α-plane, as is used in a fan geometry which is standard geometry widely used in conventional tomography e.g. in the medical field. The fan geometry is exemplified in FIG. 26, in which an emitter emits rays in many directions, and sensors are placed to measure the received energy from this single emitter on a number of detection lines D, illustrated by dashed lines in FIG. 26. Thus, the measurement system collects projection values for a set of detection lines D extending from the emitter when located at angle $\beta_i$. In the illustrated example, each detection line D is defined by the angular location β of the emitter with respect to a reference angle (β=0 coinciding with the x-axis), and the angle α of the detection line D with respect to a reference line (in this example, a line going from the emitter through the origin). The measurement system is then rotated slightly (δβ) around the origin of the x,y coordinate system in FIG. 26, to collect a new set of projection values for this new angular location. Thus, each detection line can be represented by a sampling point in sample space defined by the angular emitter location parameter β and the angular direction parameter α. All of the above-described adjustment factors and reconstruction steps are equally applicable to such a sample space. However, the 1D filter in the filtered back projection algorithm is applied to extend in the α dimension, and the back projection operator is different from the one used in the above-described parallel geometry. Suitable filters and operators are found in the literature. With respect to the use of β-α-plane, FIG. 27 exemplifies a technique for assigning values to the parameters α and β for the detection lines of a touch-sensitive apparatus. The apparatus is circumscribed by a fictitious circle C which may or may not be centered at the origin of the x,y coordinate system (FIG. 2) of the apparatus. The emitters 2 and sensors 3 define detection lines (not shown) across the touch surface 1. To assign values of parameters α and β for each detection line, the intersection between the detection line and the circle C is taken to define a β value, whereas the α value of each detection line is given by the inclination angle of the detection line with respect to the above-mentioned reference line.

It is also to be understood that the reconstructed attenuation field may be subjected to post-processing before the touch data extraction (step 26 in FIG. 10A). Such post-processing may involve different types of filtering, for noise removal and/or image enhancement.

Furthermore, the reconstructed attenuation field need not represent the distribution of attenuation coefficient values within the touch surface, but could instead represent the distribution of energy, relative transmission, or any other relevant entity derivable by processing of projection values given by the output signal of the sensors. Thus, the projection values ("data samples") may represent measured energy, differential energy (e.g. given by a measured energy value subtracted by a background energy value for each detection line), relative attenuation, relative transmission, a logarithmic attenuation, etc. The person skilled in the art realizes that there are other ways of generating projection values based on the output signal. For example, each individual projection signal included in the output signal may be subjected to a high-pass filtering in the time domain, whereby the thus-filtered projection signals represent background-compensated energy and can be sampled for generation of projection values.

Furthermore, all the above embodiments, examples, variants and alternatives given with respect to an FTIR system are equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the sensors may be vibration sensors (e.g. acoustic or piezoelectric sensors).

The invention claimed is:

1. A method of enabling touch determination based on an output signal from a touch-sensitive apparatus, the touch-sensitive apparatus comprising a panel configured to conduct light wave signals from a plurality of peripheral incoupling points to a plurality of peripheral outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, the method comprising:

processing the output signal to generate a set of data samples, wherein each data sample is indicative of transmitted light wave energy on one of the detection lines and is defined by a signal value and first and second dimension values in a two-dimensional sample space, wherein the first and second dimension values define the location of the detection line on the surface portion, and wherein the data samples are non-uniformly arranged in the sample space;

obtaining adjustment factors for the set of data samples, wherein each adjustment factor is representative of the local density of data samples in the sample space for a respective data sample;

processing the set of the data samples by tomographic reconstruction, while applying the adjustment factors by scaling the signal value of each data sample in the set of data samples by its corresponding adjustment factor, to generate data indicative of a reconstructed distribution of a light wave attenuation parameter within at least part of the surface portion;

wherein the reconstructed distribution includes spatial data points, each spatial data point having a unique location on the surface portion and corresponding to a curve of a sinogram in the sample space; and wherein the processing the set of data samples includes,
generating filtered signal values for the data samples by scaling the signal value of each data sample by a weight given by a filter function based on the distance of the data sample from the curve in the first dimension, and evaluating each spatial data point by
scaling the filtered signal value by the adjustment factor of the
corresponding data sample, and
summing the scaled filtered signal values.

2. The method of claim 1, wherein the adjustment factor for a given data sample is calculated to represent the number of data samples within a region around the given data sample in the sample space.

3. The method of claim 1, wherein the adjustment factor for a given data sample is calculated to represent an average of a set of smallest distances between the given data sample and neighboring data samples in the sample space.

4. The method of claim 1, wherein the adjustment factor for a given data sample is calculated to represent an extent of a Voronoi cell or a set of Delaunay triangles in the sample space for the given data sample.

5. The method of claim 1, wherein
the adjustment factor for a given data sample is calculated, for each spatial data point in a set of spatial data points, to represent the interaction between the curve and a two-dimensional basis function located at the given data sample; and
the basis function is given an extent in the sample space that is dependent on the local density.

6. The method of claim 5, wherein the interaction is calculated by evaluating a line integral of the basis function, along the curve.

7. The method of claim 5, wherein the obtaining comprises:
obtaining, for each spatial data point, a set of adjustment factors associated with a relevant set of data samples.

8. The method of claim 1, wherein the curve is designed to include the shape of a one-dimensional filter function which extends in the first dimension of the sample space and which is centered on and reproduced at plural locations along the curve.

9. The method of claim 5, wherein the processing the output signal comprises:
obtaining a measurement value for each detection line; and
applying a measurement value filter function to generate a filtered signal value for each measurement value, wherein the filtered signal values for the measurement values form said signal values of the data samples.

10. The method of claim 9, wherein the measurement value filter function is a one-dimensional filter function which is applied in the first dimension of the sample space.

11. The method of claim 9, wherein the applying the measurement value filter function comprises:
obtaining estimated signal values around each measurement value in the first dimension; and
operating the measurement value filter function on the measurement value and the estimated signal values.

12. The method of claim 11, wherein the filtered signal value for each measurement value is generated as a weighted summation of the measurement values and the estimated signal values based on the measurement value filter function.

13. The method of claim 12, wherein the estimated signal values are obtained as measurement values of other detection lines, said other detection lines being selected as a best match to the extent of the measurement value filter function in the first dimension.

14. The method of claim 12, wherein the estimated signal values are generated at locations around the measurement value in the sample space.

15. The method of claim 14, wherein the estimated signal values are generated by interpolation in the sample space based on the measurement values.

16. The method of claim 15, wherein each estimated signal value is generated by interpolation of measurement values of neighboring data samples in the sample space.

17. The method of claim 15, wherein the processing the output signal further comprises:
obtaining a two-dimensional interpolation function with nodes corresponding to the data samples; and
calculating the estimated signal values according to the interpolation function and based on the measurement values of the data samples.

18. The method of claim 1, wherein the first dimension value is a distance of the detection line in the plane of the panel from an origin, and the second dimension value is a rotation angle of the detection line in the plane of the panel.

19. The method of claim 1, wherein the first dimension value is a rotation angle of the detection line in the plane of the panel, and the second dimension value is an angular location of the incoupling or outcoupling point of the detection line.

20. A tangible computer readable medium comprising computer code which, when executed on a data-processing system, is adapted to carry out the method of claim 1.

21. A device for enabling touch determination based on an output signal from a touch-sensitive apparatus, the touch-sensitive apparatus comprising a panel configured to conduct light wave signals from a plurality of peripheral incoupling points to a plurality of peripheral outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, said device comprising a signal processor connected to receive the output signal and configured to:
process the output signal to generate a set of data samples, wherein each data sample is indicative of transmitted light wave energy on one of the detection lines and is defined by a signal value and first and second dimension values in a two-dimensional sample space, wherein the first and second dimension values define the location of the detection line on the surface portion, and wherein the data samples are non-uniformly arranged in the sample space;
obtain adjustment factors for the set of data samples, wherein each adjustment factor is representative of the local density of data samples in the sample space for a respective data sample;
process the set of the data samples by tomographic reconstruction, while applying the adjustment factors by scaling the signal value of each data sample in the set of data samples by its corresponding adjustment factor, to generate data indicative of a reconstructed distribution of a light wave attenuation parameter within at least part of the surface portion;
wherein the reconstructed distribution includes spatial data points, each spatial data point having a unique location on the surface portion and corresponding to a curve of a sinogram in the sample space; and
wherein the signal processor is further configured to process the set of data samples by
generating filtered signal values for the data samples by scaling the signal value of each data sample by a weight given by a filter function based on the distance of the data sample from the curve in the first dimension, and
evaluating each spatial data point by scaling the filtered signal value by the adjustment factor of the corresponding data sample, and summing the scaled filtered signal values.

22. A touch-sensitive apparatus, comprising:
a panel configured to conduct light wave signals from a plurality of peripheral incoupling points to a plurality of peripheral outcoupling points, thereby defining detection lines that extend across a surface portion of the panel between pairs of incoupling and outcoupling points;

at least one signal generator coupled to the incoupling points to generate the signals;

at least one signal detector coupled to the outcoupling points to generate an output signal; and a signal processor connected to receive the output signal and configured to:

process the output signal to generate a set of data samples, wherein each data sample is indicative of transmitted light wave energy on one of the detection lines and is defined by a signal value and first and second dimension values in a two-dimensional sample space, wherein the first and second dimension values define the location of the detection line on the surface portion, and wherein the data samples are non-uniformly arranged in the sample space;

obtain adjustment factors for the set of data samples, wherein each adjustment factor is representative of the local density of data samples in the sample space for a respective data sample; and process the set of the data samples by tomographic reconstruction, while applying the adjustment factors by scaling the signal value of each data sample in the set of data samples by its corresponding adjustment factor, to generate data indicative of a reconstructed distribution of a light wave attenuation parameter within at least part of the surface portion;

wherein the reconstructed distribution includes spatial data points, each spatial data point having a unique location on the surface portion and corresponding to a curve of a sinogram in the sample space; and wherein the signal processor is further configured to process the set of data samples by generating filtered signal values for the data samples by scaling the signal value of each data sample by a weight given by a filter function based on the distance of the data sample from the curve in the first dimension, and evaluating each spatial data point by scaling the filtered signal value by the adjustment factor of the corresponding data sample, and summing the scaled filtered signal values.

23. A method of enabling touch determination based on an output signal from a touch-sensitive apparatus, the touch-sensitive apparatus comprising a panel configured to conduct light wave signals from a plurality of peripheral incoupling points to a plurality of peripheral outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, the method comprising:

processing the output signal to generate a set of data samples, wherein each data sample is indicative of transmitted light wave energy on one of the detection lines and is defined by a signal value and first and second dimension values in a two-dimensional sample space, wherein the first and second dimension values define the location of the detection line on the surface portion, and wherein the data samples are non-uniformly arranged in the sample space;

obtaining adjustment factors for the set of data samples, wherein each adjustment factor is representative of the local density of data samples in the sample space for a respective data sample; and processing the set of the data samples by tomographic reconstruction, while applying the adjustment factors by scaling the signal value of each data sample in the set of data samples by its corresponding adjustment factor, to generate data indicative of a reconstructed distribution of a light wave attenuation parameter within at least part of the surface portion, wherein the reconstructed distribution includes spatial data points, each spatial data point having a unique location on the surface portion and corresponding to a curve of a sinogram in the sample space;

wherein the signal processor is further configured to process the set of data samples by generating filtered signal values for the data samples by scaling the signal value of each data sample by a weight given by a filter function based on the distance of the data sample from the curve in the first dimension, and evaluating each spatial data point by scaling the filtered signal value by the adjustment factor of the corresponding data sample, and summing the scaled filtered signal values; and wherein the adjustment factor for a given data sample is calculated to represent the number of data samples within a region around the given data sample in the sample space, or calculated to represent an average of a set of smallest distances between the given data sample and neighboring data samples in the sample space, or calculated to represent an extent of a Voronoi cell or a set of Delaunay triangles in the sample space for the given data sample.

* * * * *